United States Patent
Higashinaka et al.

(10) Patent No.: US 11,329,859 B2
(45) Date of Patent: May 10, 2022

(54) WIRELESS TRANSMITTER, WIRELESS RECEIVER, WIRELESS COMMUNICATION SYSTEM, CONTROL CIRCUIT, AND STORAGE MEDIUM

(71) Applicant: Mitsubishi Electric Corporation, Tokyo (JP)

(72) Inventors: Masatsugu Higashinaka, Tokyo (JP); Hiroyasu Sano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/968,690

(22) PCT Filed: Feb. 27, 2018

(86) PCT No.: PCT/JP2018/007333
§ 371 (c)(1),
(2) Date: Aug. 10, 2020

(87) PCT Pub. No.: WO2019/167141
PCT Pub. Date: Sep. 6, 2019

(65) Prior Publication Data
US 2020/0403841 A1    Dec. 24, 2020

(51) Int. Cl.
*H04L 27/34* (2006.01)
*H04L 27/26* (2006.01)

(52) U.S. Cl.
CPC ...... *H04L 27/3444* (2013.01); *H04L 27/2621* (2013.01); *H04L 27/2631* (2013.01); *H04L 27/2692* (2013.01)

(58) Field of Classification Search
CPC ... H04B 1/69; H04L 27/2621; H04L 27/2631; H04L 27/2692
(Continued)

(56) References Cited

U.S. PATENT DOCUMENTS 7,272,521 B1 * 9/2007 Delos .................... G01R 23/20
324/76.83
10,153,917 B1 * 12/2018 Tonietto ................ H04L 25/028
(Continued)

FOREIGN PATENT DOCUMENTS

| EP | 1821420 A1 | 8/2007 |
| EP | 2 296 331 B1 | 9/2013 |

(Continued)

OTHER PUBLICATIONS

IEEE Standard for Local and metropolitan area networks, Part 15. 4: Low-Rate Wireless Personal Area Networks (LR-WPANs), Amendment 5: Physical Layer Specifications for Low Energy, Critical Infrastructure Monitoring Networks, Jun. 14, 2013, pp. 1-135.
(Continued)

*Primary Examiner* — Emmanuel Bayard
(74) *Attorney, Agent, or Firm* — Birch, Stewart, Kolasch & Birch, LLP

(57) ABSTRACT

A transmitter includes: a phase rotation sequence generation unit that generates, on the basis of transmit bits being input, a phase rotation sequence in which a frequency response has a bandwidth; an up-sampling unit that changes a sample rate of the phase rotation sequence and further replicates the phase rotation sequence; and a frequency shift unit that shifts, by a specified amount of shift on a frequency axis, a frequency component of the phase rotation sequence acquired from the up-sampling unit.

14 Claims, 26 Drawing Sheets

(58) Field of Classification Search
USPC .................. 375/146–147, 262, 295–296, 354
See application file for complete search history.

(56) References Cited

U.S. PATENT DOCUMENTS

| | | | | |
|---|---|---|---|---|
| 2003/0142622 | A1* | 7/2003 | Kaku | H04L 1/04 |
| | | | | 370/208 |
| 2004/0158388 | A1 | 8/2004 | Atarashi et al. | |
| 2005/0249181 | A1* | 11/2005 | Vijayan | H04L 5/0048 |
| | | | | 370/344 |
| 2005/0276242 | A1* | 12/2005 | Goto | H04B 1/707 |
| | | | | 370/328 |
| 2007/0070968 | A1* | 3/2007 | Kawasaki | H04L 1/08 |
| | | | | 370/344 |
| 2007/0189414 | A1* | 8/2007 | Kawasaki | H04L 27/2621 |
| | | | | 375/295 |
| 2007/0189415 | A1* | 8/2007 | Kawasaki | H04B 1/7097 |
| | | | | 375/295 |
| 2007/0213013 | A1* | 9/2007 | Kim | H04B 7/0663 |
| | | | | 455/69 |
| 2007/0217485 | A1* | 9/2007 | Kawasaki | H04L 5/0037 |
| | | | | 375/146 |
| 2008/0214222 | A1 | 9/2008 | Atarashi et al. | |
| 2008/0225820 | A1 | 9/2008 | Atarashi et al. | |
| 2009/0002089 | A1* | 1/2009 | Karr | H04L 27/122 |
| | | | | 332/117 |
| 2009/0196166 | A1* | 8/2009 | Hamaguchi | H04L 27/265 |
| | | | | 370/210 |
| 2010/0097251 | A1* | 4/2010 | Liu | H03L 7/0812 |
| | | | | 341/111 |
| 2012/0141130 | A1* | 6/2012 | Nakashima | H04B 10/505 |
| | | | | 398/82 |
| 2013/0170524 | A1* | 7/2013 | Hasegawa | H04L 27/2615 |
| | | | | 375/211 |
| 2014/0016452 | A1* | 1/2014 | Hasegawa | H04L 27/2636 |
| | | | | 370/210 |
| 2016/0269219 | A1* | 9/2016 | Wang | H04L 27/3872 |
| 2016/0298446 | A1* | 10/2016 | Maida | G01V 3/30 |
| 2018/0267167 | A1* | 9/2018 | Morita | G01S 15/50 |
| 2019/0020531 | A1* | 1/2019 | Ge | H03C 3/40 |

FOREIGN PATENT DOCUMENTS

| | | |
|---|---|---|
| JP | 4276009 B2 | 6/2009 |
| WO | WO 2016/134946 A1 | 9/2016 |

OTHER PUBLICATIONS

Marubayashi et al., "Spread Spectrum Communication and Its Applications," Incorporated Association: Compilation of the Institute of Electronics, Information, and Communication Engineers, May 10, 1998, pp. 182-238.

Notification of Reasons for Refusal issued in Taiwanese Patent Application No. 107118481, dated Jun. 23, 2020.

Ozaki et al., "A Study on PAPR Reduction Technique in MFSK/DS Block Transmission," IEICE Technical Report, vol. 113, No. 456, Feb. 24, 2014, pp. 25-30.

Extended European Search Report, dated Dec. 23, 2020, for European Application No. 18907503.9.

Indian Office Action dated Nov. 22, 2021 issued in the Indian Patent Office in Application No. 202047035971 with an English Translation.

European Office Action for European Application No. 18907503.9, dated Aug. 30, 2021.

* cited by examiner

WIRELESS TRANSMITTER, WIRELESS RECEIVER, WIRELESS COMMUNICATION SYSTEM, CONTROL CIRCUIT, AND STORAGE MEDIUM

FIELD

The present invention relates to a wireless transmitter, a wireless receiver, and a wireless communication system that perform wireless communication.

BACKGROUND

In recent years, for example, sensor networks, and M2M (machine to machine) communication using wireless communication have become widespread in order to, for example, collect data from remote devices or perform remote control on devices. In such applications, it is desirable that the communication range between wireless communication terminals be long range from the standpoint of the flexibility of network deployment.

In order to achieve long-range wireless communication, for example, one can consider a configuration using direct sequence spread spectrum described in Non Patent Literature 1. Chapter 19. 1 of Non Patent Literature 1 discloses a direct sequence spread spectrum system using binary spreading codes, which is a communication system in the physical layer of wireless communication for low energy, critical infrastructure monitoring (LECIM). In the direct sequence spread spectrum system, an increase in the used spreading factor increases the resistance to noise and the communication range, but decreases the transmission rate. That is, the direct sequence spread spectrum system has a trade-off between the communication range and the transmission rate. When the direct sequence spread spectrum system is used in a situation where a wireless communication terminal performs communication at the same time using the same frequency as another wireless communication, these different communications use different spreading codes to thereby reduce interference between the communications.

CITATION LIST

Non Patent Literature

Non Patent Literature 1: IEEE Standard for Local and metropolitan area networks Part 15. 4: Low-Rate Wireless Personal Area Networks (LR-WPANs), Amendment 5: Physical Layer Specifications for Low Energy, Critical Infrastructure Monitoring Networks

SUMMARY

Technical Problem

The wireless communication technology disclosed in Non Patent Literature 1 can reduce deterioration of communication quality due to interference. Unfortunately, the wireless communication technology of Non Patent Literature 1 poses a problem of a large difference between an average power and a peak power of a transmit signal as the signal transmission is performed using the binary spreading codes. When the difference between the average power and the peak power of the transmit signal is large, it is necessary to increase the back-off of an amplifier in order to inhibit, for example, unnecessary out-of-band radiation, and waveform distortion caused by the use of a non-linear amplifier. As a result, the upper limit of available transmit power is reduced and thus the communication range is limited.

The present invention has been made in view of the above, and an object of the present invention is to provide a wireless transmitter capable of achieving long-range wireless communication as well as reducing deterioration of communication quality due to interference.

Solution to Problem

In order to solve the above problem and achieve the object, a wireless transmitter of the present invention comprises: a phase rotation sequence generation unit to generate, on a basis of input transmit bits, a phase rotation sequence in which a frequency response has a bandwidth; an up-sampling unit to change a sample rate of the phase rotation sequence and further replicate the phase rotation sequence; and a frequency shift unit to shift, by a specified amount of shift on a frequency axis, a frequency component of the phase rotation sequence acquired from the up-sampling unit.

Advantageous Effects of Invention

The wireless transmitter according to the present invention has an effect of achieving the long-range wireless communication as well as reducing the deterioration of communication quality due to the interference.

DESCRIPTION OF EMBODIMENTS

A wireless transmitter, a wireless receiver, and a wireless communication system according to embodiments of the present invention will now be described in detail with reference to the drawings. Note that the present invention is not limited to the embodiments.

First Embodiment

Figure 1:
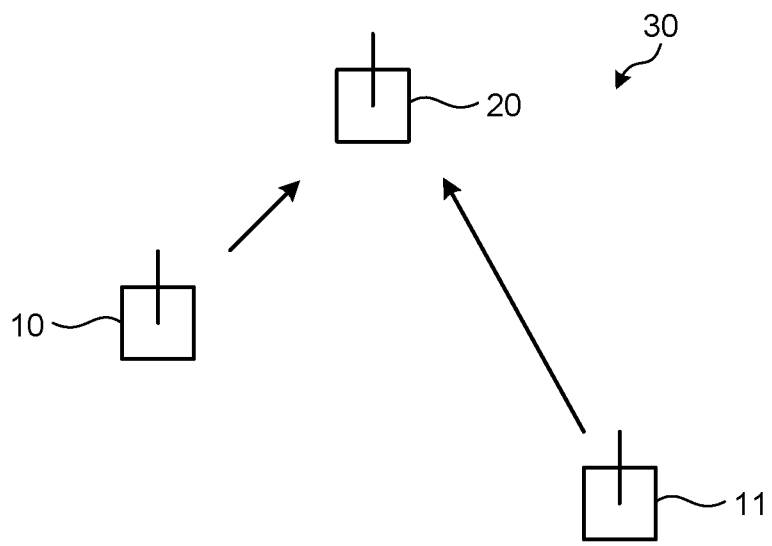
FIG. 1 is a diagram illustrating an example of the configuration of a wireless communication system according to a first embodiment.

FIG. 1 is a diagram illustrating an example of the configuration of a wireless communication system 30 according to a first embodiment of the present invention. The wireless communication system 30 includes a first transmitter 10, a second transmitter 11, and a receiver 20. In the wireless communication system 30, the first transmitter 10 transmits data to the receiver 20, and also the second transmitter 11 transmits data to the receiver 20. In the wireless communication system 30 illustrated in FIG. 1, the distance between the receiver 20 and the first transmitter 10 is shorter than the distance between the receiver 20 and the second transmitter 11. The configurations of the first transmitter 10 and the second transmitter 11 are similar to each other. In the following description, each of the first transmitter 10 and the second transmitter 11 may be simply referred to as a transmitter where the first transmitter 10 and the second transmitter 11 need not be distinguished from each other.

Figure 2:
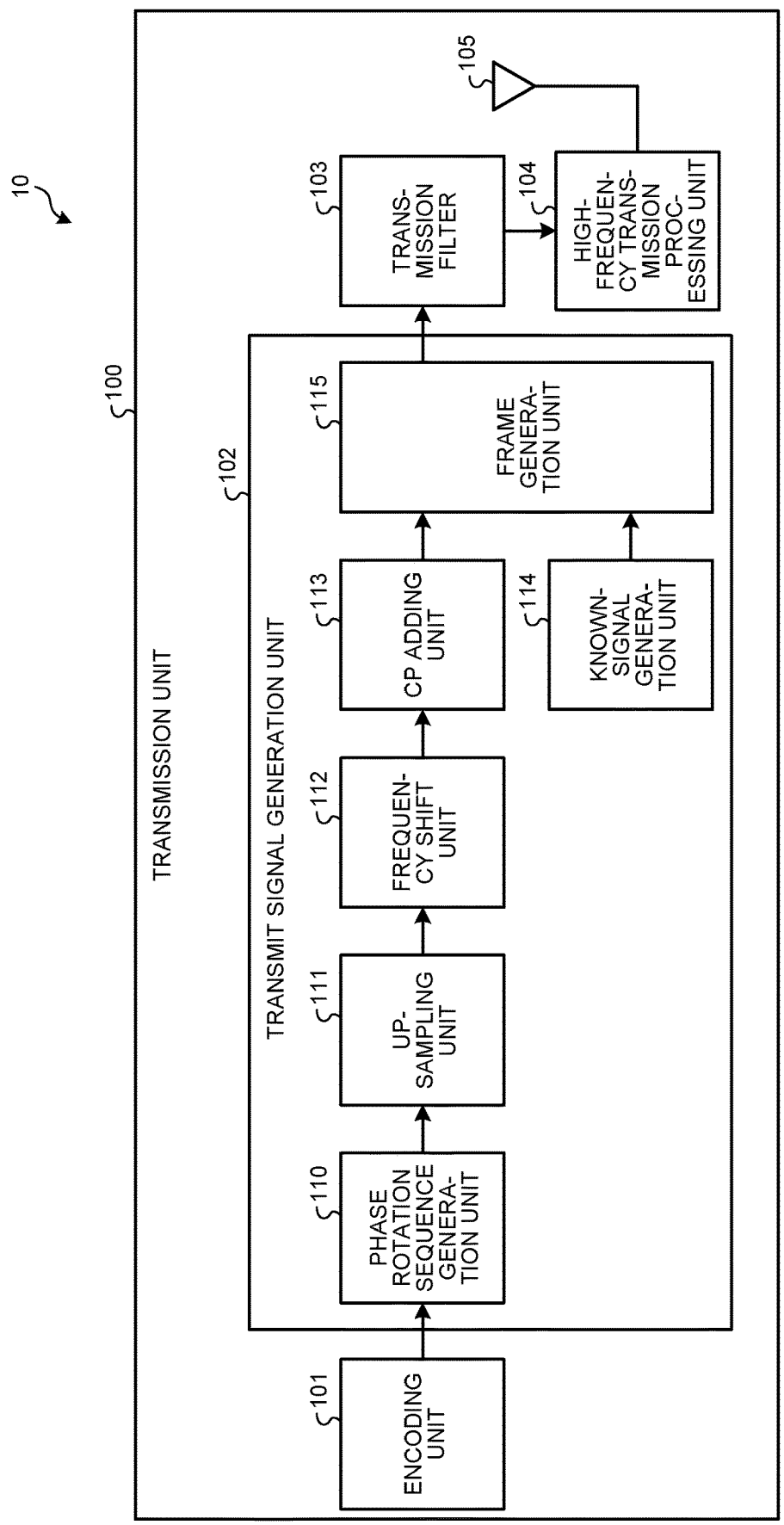
FIG. 2 is a diagram illustrating an example of the configuration of a transmission unit of a first transmitter according to the first embodiment.

The configuration and operation of the first transmitter 10 and the second transmitter 11 each being a wireless transmitter will be described. Hereinafter, the first transmitter 10 will be described by way of example. FIG. 2 is a diagram illustrating an example of the configuration of a transmission unit 100 of the first transmitter 10 according to the first embodiment. The transmission unit 100 includes an encoding unit 101, a transmit signal generation unit 102, a transmission filter 103, a high-frequency transmission processing unit 104, and a transmitting antenna 105. The transmit signal generation unit 102 includes a phase rotation sequence generation unit 110, an up-sampling unit 111, a frequency shift unit 112, a cyclic prefix (CP) adding unit 113, a known-signal generation unit 114, and a frame generation unit 115.

Figure 3:
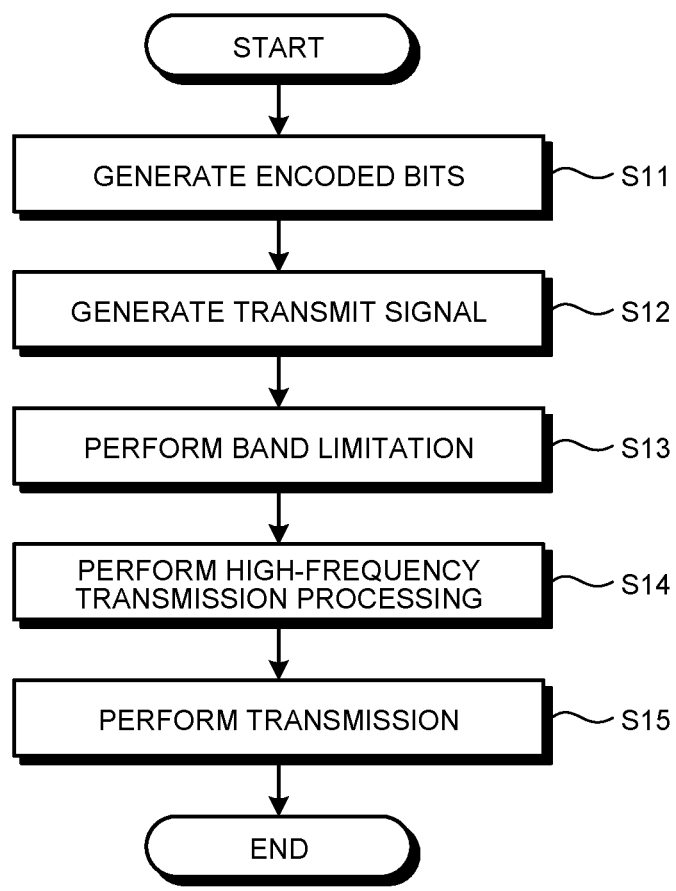
FIG. 3 is a flowchart illustrating an operation of the transmission unit of the first transmitter according to the first embodiment.

First, an overview of the operation of the transmission unit 100 illustrated in FIG. 2 will be described. FIG. 3 is a flowchart illustrating the operation of the transmission unit 100 of the first transmitter 10 according to the first embodiment. The encoding unit 101 generates encoded bits by performing error correction coding on data bits in accordance with a specified method (step S11). The error correction coding method may be a generally known method such as convolutional coding, turbo coding, or low density parity check (LDPC) coding. The encoding unit 101 may also perform interleaving processing or the like on the encoded bits for rearranging the order of bits. The encoding unit 101 outputs the encoded bits generated to the transmit signal generation unit 102. The transmit signal generation unit 102 generates a transmit signal by performing processing described later, using the encoded bits that are transmit bits passed from the encoding unit 101 (step S12). The transmit signal generation unit 102 outputs the generated transmit signal to the transmission filter 103. The transmission filter 103 performs band limitation on the transmit signal passed from the transmit signal generation unit 102 (step S13). The transmission filter 103 is, for example, a generally known root Nyquist filter or the like. The transmission filter 103 outputs, to the high-frequency transmission processing unit 104, the transmit signal subjected to the band limitation. The high-frequency transmission processing unit 104 performs general high-frequency transmission processing on the transmit signal subjected to band limitation and passed from the transmission filter 103 (step S14). The general high-frequency transmission processing includes, for example, conversion processing from a digital signal to an analog signal and up-conversion to a carrier frequency. The high-frequency transmission processing unit 104 then transmits the transmit signal from the transmitting antenna 105 (step S15).

Figure 4:
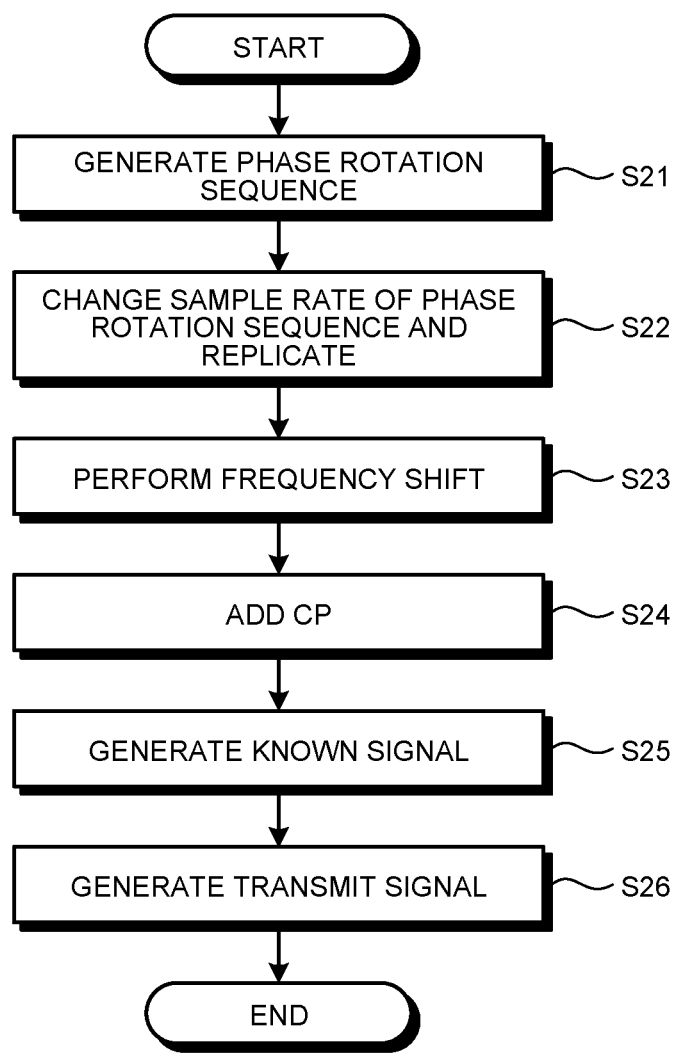
FIG. 4 is a flowchart illustrating an operation of generating a transmit signal by a transmit signal generation unit according to the first embodiment.

The operation of the transmit signal generation unit 102 will be described in detail. FIG. 4 is a flowchart illustrating the operation of generating the transmit signal by the transmit signal generation unit 102 according to the first embodiment. The flowchart illustrated in FIG. 4 details the processing of step S12 illustrated in FIG. 3.

The encoded bits passed from the encoding unit 101 to the transmit signal generation unit 102 are input to the phase rotation sequence generation unit 110. The phase rotation sequence generation unit 110 generates a phase rotation sequence having a frequency bandwidth, on the basis of the encoded bits that are the transmit bits (step S21). Specifically, the phase rotation sequence generation unit 110 performs processing of selecting and outputting phase rotation sequences associated one-to-one with the encoded bits. The phase rotation sequence used in the present embodiment has characteristics of providing a frequency response having a bandwidth, and the phase rotation sequence is generated by changing a parameter indicating the type of the phase rotation sequence in accordance with the input transmit bits, or the encoded bits in this case. In the present embodiment, the phase rotation sequence generation unit 110 of the transmit signal generation unit 102 generates the phase rotation sequence, using a frequency modulated signal (hereinafter referred to as a first phase rotation sequence) having no bandwidth and a phase rotation sequence (hereinafter referred to as a second phase rotation sequence) having a frequency component changing over time. The phase rotation sequence generation unit 110 generates the phase rotation sequence as shown in expression (1) below, where "m" represents a sample number, "x (m)" represents the phase rotation sequence, "M" represents a sequence length of the phase rotation sequence, "k" represents a parameter corresponding to the encoded bits (where 0≤k<M), "s (m)" represents the first phase rotation sequence, and "c (m)" represents the second phase rotation sequence. Using the following expression (1), the transmit signal generation unit 102 generates the phase rotation sequence.

$$x(m) = s(m) \times c(m)$$

$$= \exp(j2\pi km/M) \times \exp(j\pi \times r \times m \times m/M)$$

$$= \exp(j2\pi(k+0.5r \times m)m/M) \quad (1)$$

In expression (1), the character "j" represents an imaginary unit. The character "r" represents a parameter indicating the type of the second phase rotation sequence c (m). Where the sequence length of the phase rotation sequence is, for example, M=4, the phase rotation sequence generation unit 110 receives the encoded bits from the encoding unit 101 on a two-bit-by-two-bit basis, and selects the parameter of k=0 when the two-bit encoded bits are "00", selects k=1 when "01", selects k=2 when "10", or selects k=3 when "11". The phase rotation sequence generation unit 110 performs calculation of expression (1), using the values of the selected "k" and the predetermined parameter "r", thereby generating the phase rotation sequence. Note that the waveform of the phase rotation sequence generated by expression (1) is uniquely determined when the parameters "M", "k", and "r" are determined. Therefore, the waveform of the phase rotation sequence stored in a memory in advance may be selected according to the parameters. The phase rotation sequence generation unit 110 outputs the generated phase rotation sequence to the up-sampling unit 111.

Figure 5:
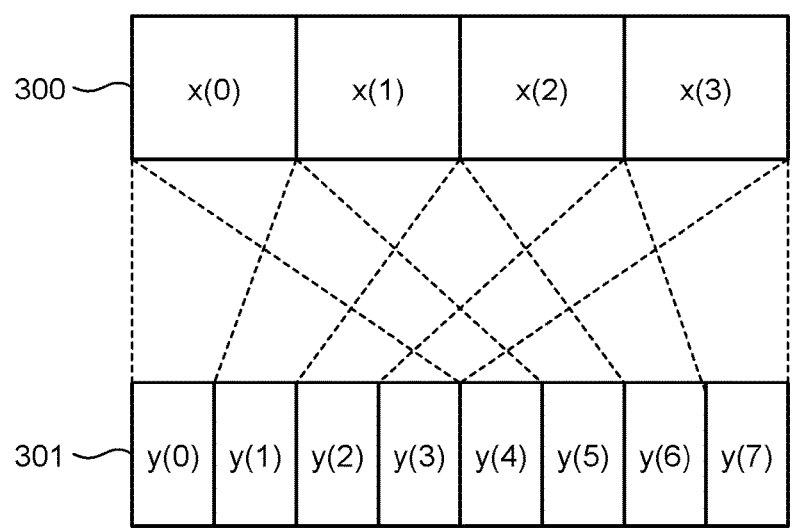
FIG. 5 is a diagram illustrating an image of processing in an up-sampling unit according to the first embodiment.

The up-sampling unit 111 changes the sample rate of the phase rotation sequence passed from the phase rotation sequence generation unit 110, and also replicates the phase rotation sequence at the changed sample rate change (step S22). Specifically, the up-sampling unit 111 performs up-sampling processing of multiplying the sample rate of the phase rotation sequence by a specified coefficient (hereinafter, "L" represents the specified coefficient) and replicating the number of samples of the phase rotation sequence L-fold, thereby providing the post-up-sampling phase rotation sequence. The coefficient "L" is an integer of 2 or more. FIG. 5 is a diagram illustrating an image of the processing in the up-sampling unit 111 according to the first embodiment. FIG. 5 illustrates a case of a phase rotation sequence with the sequence length of M=4 and the specified coefficient of L=2. In FIG. 5, a phase rotation sequence 300 indicates the four (M=4) samples of the phase rotation sequence passed from the phase rotation sequence generation unit 110, and a phase rotation sequence 301 indicates the phase rotation sequence subjected to up-sampling by the up-sampling unit 111. In FIG. 5, the widths of the phase rotation sequences 300 and 301 image the sample intervals. As a result of the up-sampling unit 111 multiplying the sample rate by L=2, the phase rotation sequence 301 subjected to up-sampling provides the sample interval that is 1/L=1/2 of the sample interval in the phase rotation sequence 300. Moreover, since the up-sampling unit 111 multiplies the number of samples of the phase rotation sequence 300 by L=2, the number of samples of the phase rotation sequence 301 subjected to up-sampling is eight (M×L=8). When "n" represents the sample number and "y (n)" represents the phase rotation sequence subjected to up-sampling, sample values in the phase rotation sequence 301 subjected to up-sampling is arranged in the order represented by: y (0)=x (0), y (1)=x (1), y (2)=x (2), y (3)=x (3), y (4)=x (0), y (5)=x (1), y (6)=x (2), and y (7)=x (3). The up-sampling unit 111 outputs the phase rotation sequence 301 subjected to up-sampling to the frequency shift unit 112.

The frequency shift unit 112 performs a frequency shift on the post-up-sampling phase rotation sequence 301 passed from the up-sampling unit 111, thereby shifting a frequency component of the signal on a frequency axis on the basis of a specified amount of shift (step S23), and generates a post-frequency-shift phase rotation sequence. Assuming that "yf (n)" represents the post-frequency-shift phase rotation sequence, the processing of the frequency shift unit 112 can be implemented by applying a phase rotation θ corresponding to the amount of shift on the frequency axis as expressed by the following expression (2).

$$yf(n)=y(n)\times\exp(j2\pi\theta n/N) \qquad (2)$$

In expression (2), the character "N" represents the number of samples of the post-up-sampling phase rotation sequence, where N=M×L. The frequency shift unit 112 outputs the post-frequency-shift phase rotation sequence to the CP adding unit 113.

The CP adding unit 113 adds a CP to the post-frequency-shift phase rotation sequence passed from the frequency shift unit 112 (step S24). Specifically, the CP adding unit 113 replicates a specified number of the samples from the end of the post-frequency-shift phase rotation sequence, and adds replicated ones to the beginning of the phase rotation sequence after frequency shift, thereby providing a CP-added phase rotation sequence. The CP adding unit 113 outputs the generated, CP-added phase rotation sequence with CP to the frame generation unit 115.

The known-signal generation unitknown-signal generation unit 114 generates a known signal used in the receiver 20 for performing demodulation processing (step S25). In the present embodiment, the known signal is the CP-added phase rotation sequence that is identical to the CP-added phase rotation sequence generated by the above-described phase rotation sequence generation unit 110 when the parameter of k=0 is given. The parameters such as the sequence length "M" of the phase rotation sequence, the coefficient "L" of up-sampling, and the phase rotation θ used for the frequency shift are the same as those used in the units including the phase rotation sequence generation unit 110 to the CP adding unit 113. Note that, to perform the processing of generating the known signal, the known-signal generation unit 114 may readably store, in a memory, the same signal waveform as that of the described above known signal. Alternatively, to generate the known signal, the known-signal generation unitknown-signal generation unit 114 may share circuits of the phase rotation sequence generation unit 110 to the CP adding unit 113. Alternatively, the known-signal generation unitknown-signal generation unit 114 may include dedicated circuits identical to those of the phase rotation sequence generation unit 110 to the CP adding unit 113. The known-signal generation unit 114 outputs the generated, known signal to the frame generation unit 115.

Figure 6:
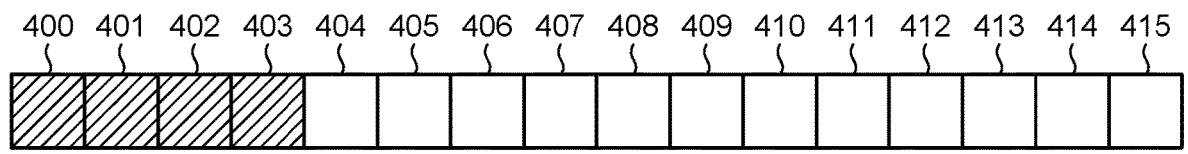
FIG. 6 is a diagram illustrating an example of a frame configuration of a transmit signal generated by a frame generation unit according to the first embodiment.

The frame generation unit 115 performs processing of arranging the CP-added phase rotation sequence passed from the CP adding unit 113 and the known signal passed from the known-signal generation unit 114, in accordance with a specified frame configuration, thereby generating a transmit signal (step S26). FIG. 6 is a diagram illustrating an example of the frame configuration of the transmit signal generated by the frame generation unit 115 according to the first embodiment. In FIG. 6, known signals 400 to 403 indicate symbols of the known signal passed from the known-signal generation unit 114, and data signals 404 to 415 indicate symbols of the CP-added phase rotation sequence generated on the basis of the encoded bits and passed from the CP adding unit 113. According to the frame configuration illustrated in FIG. 6, the transmit signal is defined by the four known signals arranged at the beginning of the frame, followed by the arrangement of the CP-added twelve phase rotation sequences generated on the basis of the encoded bits. The frame generation unit 115 outputs the generated transmit signal to the transmission filter 103. The subsequent operation of the transmission unit 100 is as described above.

Figure 7:
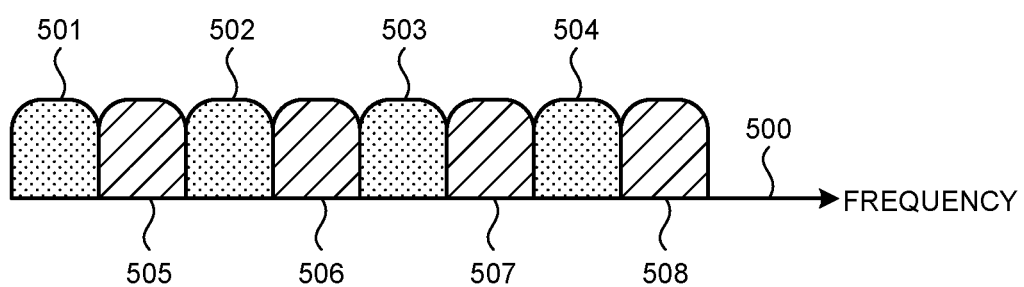
FIG. 7 is a diagram illustrating an image of frequency spectra of transmit signals generated by the first transmitter and a second transmitter according to the first embodiment.

Here, a method of setting the various parameters for the transmit signal generation unit 102 of each of the first transmitter 10 and the second transmitter 11 will be described. In the present embodiment, the first transmitter 10 and the second transmitter 11 use the parameters "r" indicating different types of the second phase rotation sequence used in the phase rotation sequence generation unit 110. For example, r=1 is set for the first transmitter 10, and r=2 is set for the second transmitter 11. The values of the coefficient "L" in the up-sampling units 111 of the transmitters are the same. The values of the phase rotation θ in the frequency shift units 112 of the transmitters are differently set. For example, the phase rotation θ in the above expression (2) for the first transmitter 10 is zero (θ=0), that is, the phase rotation θ is set such that the frequency shift is not performed. The phase rotation θ in the above expression (2) for the second transmitter 11 is set to one (θ=1). In this case, an image of transmission spectra of transmit signals generated with the parameters of M=4, L=2, and N=8 is illustrated in FIG. 7. FIG. 7 is a diagram illustrating an image of frequency spectra of the transmit signals generated by the first transmitter 10 and the second transmitter 11 according to the first embodiment. On a frequency axis 500 illustrated in FIG. 7, transmission spectra 501 to 504 indicate the frequency spectra of the transmit signal generated by the first transmitter 10, and transmission spectra 505 to 508 indicate the frequency spectra of the transmit signal generated by the second transmitter 11. In the present embodiment, the transmit signal generation unit 102 of each of the first transmitter 10 and the second transmitter 11 generates the transmit signal as described above, so that the transmission spectra of the transmit signals generated by the first transmitter 10 and the second transmitter 11 are uniformly distributed on the frequency axis. Moreover, since the values of the phase rotation θ are different between the first transmitter 10 and the second transmitter 11, the transmission spectra of the transmit signals of the transmitters can be arranged alternately without overlapping on the frequency axis. Note that the various parameters for the transmit signal generation unit 102 of each of the first transmitter 10 and the second transmitter 11 can be set by an administrator of the wireless communication system 30, but the method of setting those parameters is not limited thereto.

Figure 8:
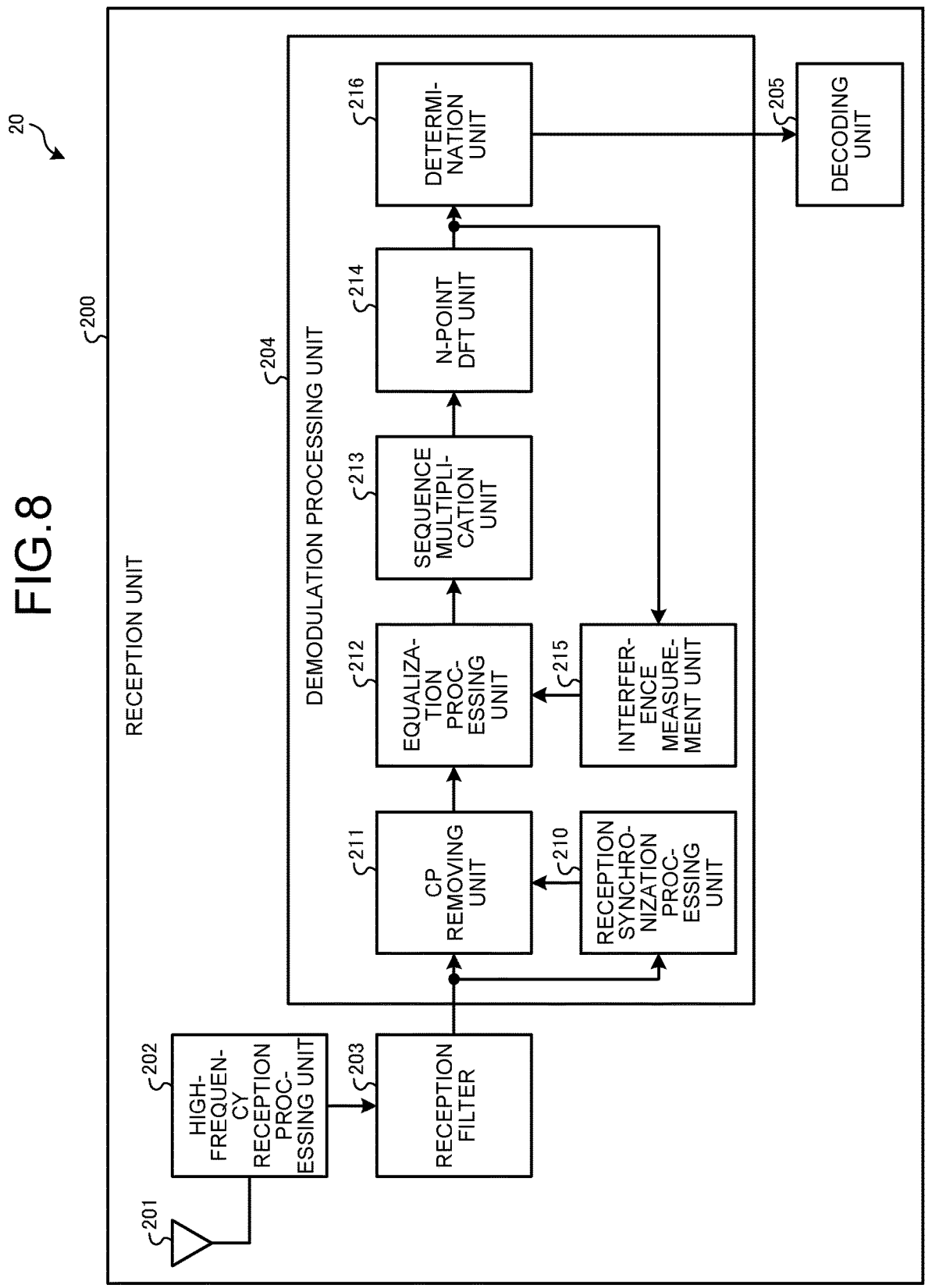
FIG. 8 is a diagram illustrating an example of the configuration of a reception unit included in a receiver according to the first embodiment.

Next, the configuration and operation of the receiver 20 that is a wireless receiver will be described. FIG. 8 is a diagram illustrating an example of the configuration of a reception unit 200 included in the receiver 20 according to the first embodiment. The reception unit 200 includes a receiving antenna 201, a high-frequency reception processing unit 202, a reception filter 203, a demodulation processing unit 204, and a decoding unit 205. The demodulation processing unit 204 includes a reception synchronization processing unit 210, a CP removing unit 211, an equalization processing unit 212, a sequence multiplication unit 213, an N-point discrete Fourier transform (DFT) unit 214, an interference measurement unit 215, and a determination unit 216.

Figure 9:
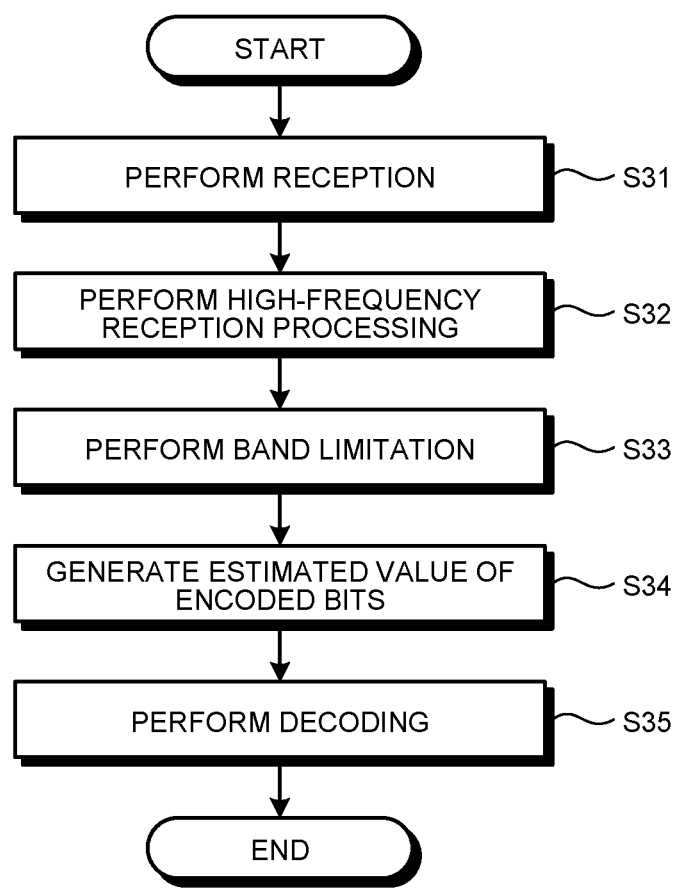
FIG. 9 is a flowchart illustrating an operation of the reception unit of the receiver according to the first embodiment.

First, an overview of the operation of the reception unit 200 illustrated in FIG. 8 will be described. FIG. 9 is a flowchart illustrating an operation of the reception unit 200 of the receiver 20 according to the first embodiment. The receiving antenna 201 receives a high-frequency received signal (step S31). The receiving antenna 201 outputs the high-frequency received signal to the high-frequency reception processing unit 202. The high-frequency reception processing unit 202 performs general high-frequency reception processing on the high-frequency received signal (step S32). The general high-frequency reception processing includes down-conversion, filtering, and conversion from an analog signal to a digital signal. The high-frequency reception processing unit 202 outputs, to the reception filter 203, the received signal subjected to high-frequency reception processing. The reception filter 203 performs band limitation, using, for example, a root Nyquist filter equivalent to that used by the transmission filter 103 of the transmission unit 100 (step S33). The reception filter 203 outputs, to the demodulation processing unit 204, the received signal subjected to band limitation processing. Note that the signal subjected to band limitation processing is output, as a complex baseband received signal, from the reception filter 203. The demodulation processing unit 204 performs processing described later on the complex baseband received signal to thereby generate an estimated value of the encoded bits (step S34). The demodulation processing unit 204 outputs the generated, estimated value of the encoded bits to the decoding unit 205. The decoding unit 205 subjects the received, estimated value of the encoded bits to processing of decoding the error correction code (step S35), such that the decoding unit 205 obtains decoded bits. The error correction code is employed in the encoding unit 101 of the transmission unit 100.

Figure 10:
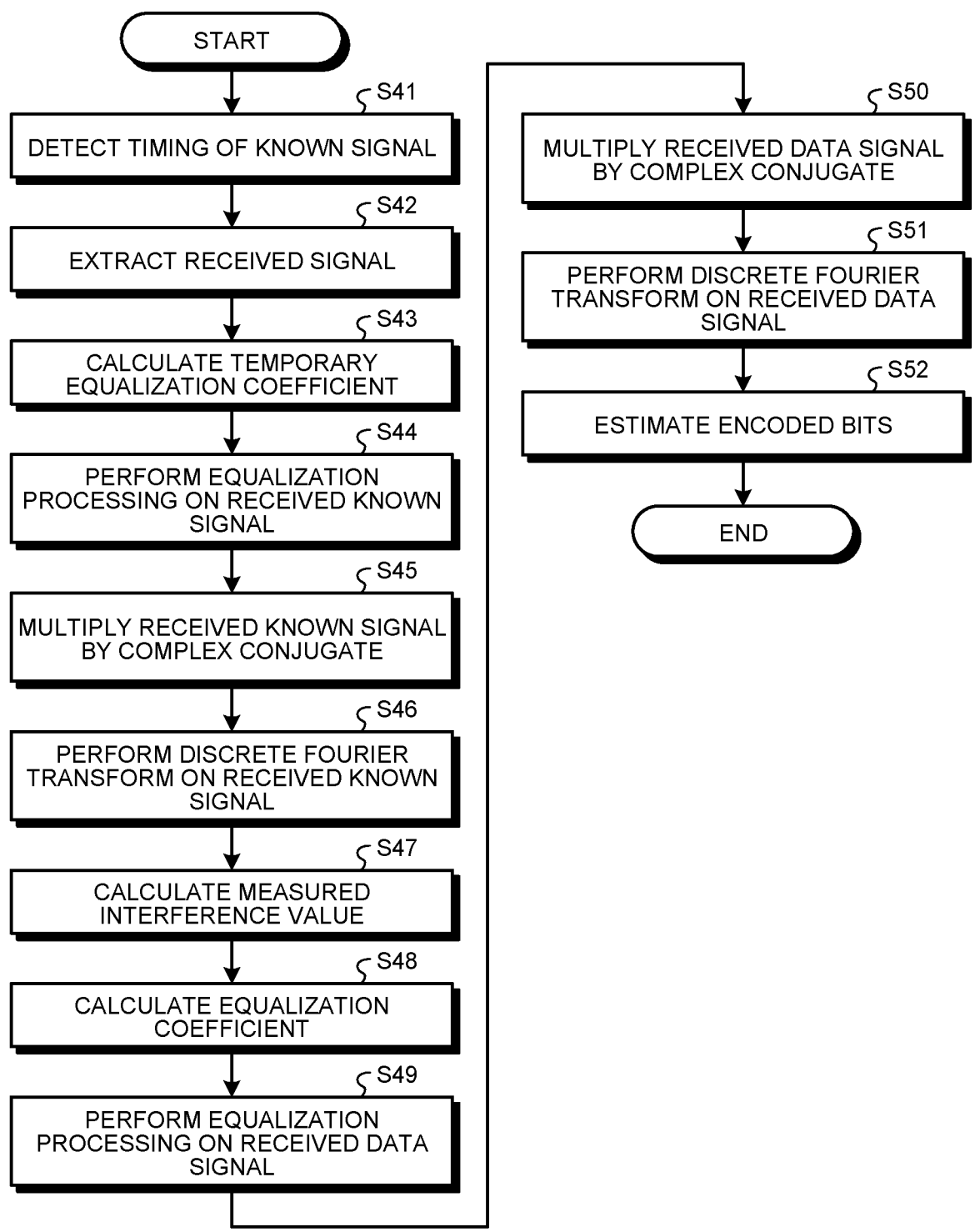
FIG. 10 is a flowchart illustrating an operation of generating an estimated value of encoded bits by a demodulation processing unit according to the first embodiment.

The operation of the demodulation processing unit 204 will be described in detail. FIG. 10 is a flowchart illustrating the operation of generating the estimated value of the encoded bits by the demodulation processing unit 204 according to the first embodiment. The flowchart illustrated in FIG. 10 details the processing of step S34 illustrated in FIG. 9.

The complex baseband received signal passed from the reception filter 203 to the demodulation processing unit 204 is input to each of the reception synchronization processing unit 210 and the CP removing unit 211. The reception synchronization processing unit 210 detects, from the complex baseband received signal, the timing of the known signal in the frame (step S41). The reception synchronization processing unit 210 holds in advance, for example, a known signal having the same waveform as the known signal generated by the known-signal generation unit 114 of the transmitter. The reception synchronization processing unit 210 can detect the timing of the known signal by a method that involves performing cross correlation processing on the complex baseband received signal through the use of the held, known signal and detecting a peak of a cross correlation value. By the reception synchronization processing unit 210 detecting the timing of the known signal, a correspondence between the complex baseband received signal and the frame configuration is established so that the demodulation processing unit 204 can perform demodulation processing in synchronization with the frame configuration.

The CP removing unit 211 removes the CP added by the CP adding unit 113 of the transmitter, from the complex baseband received signal on the basis of the timing detected by the reception synchronization processing unit 210, and thus extracts the received signal (step S42). The CP removing unit 211 outputs the extracted, received signal to the equalization processing unit 212.

Using the received signal passed from the CP removing unit 211 and a measured interference value passed from the interference measurement unit 215, the equalization processing unit 212 performs equalization processing that corrects waveform distortion occurred in the wireless transmission path. The measured interference value is obtained by processing described later. The equalization processing unit 212 outputs the post-equalization received signal to the sequence multiplication unit 213. Here, the equalization processing unit 212 first performs equalization processing on the received signal (hereinafter referred to as a received known signal) having the CP removed by the CP removing unit 211. The received known signal is a signal extracted from a part of the frame configuration of FIG. 6, the part corresponding to the known signals 400 to 403. Moreover, as described later, the equalization processing unit 212 performs equalization processing on the received signal (hereinafter referred to as a received data signal) having the CP removed by the CP removing unit 211. The received data signal is a signal extracted from a part of the frame configuration of FIG. 6, the part corresponding to the data signals 404 to 415, that is, the CP-added phase rotation sequence.

Figure 11:
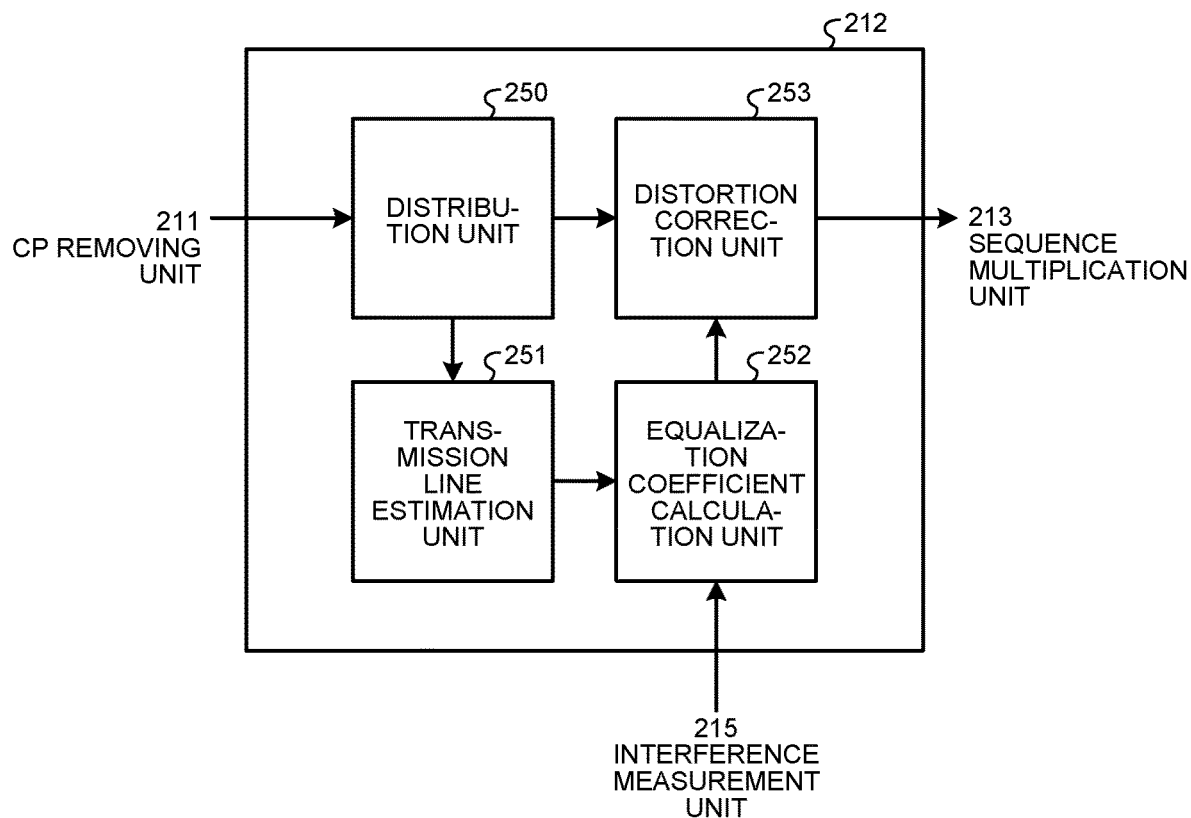
FIG. 11 is a diagram illustrating an example of the configuration of an equalization processing unit according to the first embodiment.

The equalization processing of the equalization processing unit 212 will be described in detail. FIG. 11 is a diagram illustrating an example of the configuration of the equalization processing unit 212 according to the first embodiment. The equalization processing unit 212 includes a distribution unit 250, a transmission line estimation unit 251, an equalization coefficient calculation unit 252, and a distortion correction unit 253. The received signal from the CP removing unit 211 is input to the distribution unit 250, and the measured interference value from the interference measurement unit 215 is input to the equalization coefficient calculation unit 252. For processing on the received known signal, the distribution unit 250 outputs the received known signal to the transmission line estimation unit 251 and the distortion correction unit 253. For processing on the received data signal, the distribution unit 250 outputs the received data signal to the distortion correction unit 253 as described later.

A description will be made in detail as to the processing by the equalization processing unit 212 on the received known signal. Using the received known signal, the transmission line estimation unit 251 estimates a transmission line response in the frequency domain. The transmission line estimation unit 251 performs an N-point discrete Fourier transform on the received known signal to thereby obtain a received known signal in the frequency domain. The transmission line estimation unit 251 holds in advance a frequency response of the known signal used by the first transmitter 10 and a frequency response of the known signal used by the second transmitter 11. The transmission line estimation unit 251 performs processing of removing the known signal component from the received known signal in the frequency domain, using the held, frequency responses of the known signals, and obtains an estimated transmission line value for the first transmitter 10 and an estimated transmission line value for the second transmitter 11. Specifically, from the correspondence of the transmission spectra illustrated in FIG. 7, the estimated transmission line value at the frequency corresponding to the transmission spectra 501 to 504 is the estimated transmission line value in the frequency domain for the first transmitter 10, and the estimated transmission line value at the frequency corresponding to the transmission spectra 505 to 508 is the estimated transmission line value in the frequency domain for the second transmitter 11. Where a character "z" represents the received known signal in the frequency domain at a certain frequency, a character "y" represents the frequency response of the held, known signal, and a character "h" represents the estimated transmission line value in the frequency domain, for example, the transmission line estimation unit 251 can remove the known signal component from the received known signal in the frequency domain by a calculation formula of $h=z \times y^*/|y|^2$. The character "y*" represents a complex conjugate of "y". Moreover, the transmission line estimation unit 251 can improve the estimation accuracy by time-averaging the calculated estimated transmission line values in the frequency domain among the known signals 400 to 403 for each frequency. The transmission line estimation unit 251 outputs the averaged estimated transmission line value in the frequency domain to the equalization coefficient calculation unit 252.

The equalization coefficient calculation unit 252 calculates a temporary equalization coefficient, using the estimated transmission line value in the frequency domain for the first transmitter 10 and the estimated transmission line value in the frequency domain for the second transmitter 11, the estimated transmission line values being passed from the transmission line estimation unit 251 (step S43). Where a character "w" represents the temporary equalization coefficient at a certain frequency, the equalization coefficient calculation unit 252 can calculate the temporary equalization coefficient, using an equalization coefficient based on a well-known zero-forcing criterion such as $w=h^*/|h|^2$ using the estimated transmission line value "h" in the frequency domain. The character "h*" represents a complex conjugate of the estimated transmission line value "h" in the frequency domain. Note that the equalization coefficient calculation unit 252 does not use the measured interference value in calculating the temporary equalization coefficient. The equalization coefficient calculation unit 252 outputs the temporary equalization coefficient to the distortion correction unit 253.

The distortion correction unit 253 performs an N-point discrete Fourier transform on the received known signal corresponding to the known signals 400 to 403 and passed from the distribution unit 250, and obtains a received known signal in the frequency domain. The distortion correction unit 253 holds the received known signal in the frequency domain until the processing of the transmission line estimation unit 251 and the equalization coefficient calculation unit 252 is completed and the temporary equalization coefficient is passed from the equalization coefficient calculation unit 252. Upon receiving the temporary equalization coefficient from the equalization coefficient calculation unit 252, the distortion correction unit 253 performs equalization processing by multiplying, by the temporary equalization coefficient, the received known signal in the frequency domain corresponding to the known signals 400 to 403 (step S44). The distortion correction unit 253 performs an N-point inverse discrete Fourier transform on a result of the equalization processing, such that the distortion correction unit 253 outputs a post-equalization received known signal to the sequence multiplication unit 213.

Reference is made back to the configuration of the demodulation processing unit 204 and the flowchart illustrated in FIG. 10. The sequence multiplication unit 213 holds in advance a complex conjugate of the second phase rotation sequence used in the phase rotation sequence generation unit 110 of the transmission unit 100 of each of the first transmitter 10 and the second transmitter 11. The sequence multiplication unit 213 multiplies, by the held complex conjugate of the second phase rotation sequence, the post-equalization received known signal corresponding to the known signals 400 to 403 (step S45). Here, the number of samples of the post-equalization received known signal passed from the equalization processing unit 212 is equal to N=M×L for each of the known signals 400 to 403. Since this is L times as long as the number of samples of the second phase rotation sequence, the sequence multiplication unit 213 multiplies the post-equalization received known signal by the complex conjugate of the second phase rotation sequence repeatedly L times. In the present embodiment, the first transmitter 10 and the second transmitter 11 use different values of the parameter "r" for the second phase rotation sequence. Therefore, the sequence multiplication unit 213 executes the above processing twice separately: the first processing is executed using the complex conjugate of the second phase rotation sequence used in the first transmitter 10; and the second processing is executed using the complex conjugate of the second phase rotation sequence used in the second transmitter 11. Thus, the sequence multiplication unit 213 obtains processing results for two systems. The sequence multiplication unit 213 outputs the obtained processing results for two systems obtained to the N-point DFT unit 214.

The N-point DFT unit 214 performs an N-point discrete Fourier transform on each of the processing results for two systems passed from the sequence multiplication unit 213. That is, the N-point DFT unit 214 performs an N-point discrete Fourier transform on each of the known signals 400 to 403, that is, the received known signal (step S46). The N-point DFT unit 214 that is a discrete Fourier transform unit outputs, to the interference measurement unit 215, frequency domain signals for the two systems obtained by performing the discrete Fourier transform. Note that since the processing target here is the known signal, the processing of the determination unit 216 that performs determination on the data signal in the processing described later and the subsequent processing are not performed.

The interference measurement unit 215 calculates the measured interference value (step S47). Specifically, on the basis of the frequency domain signals for two systems passed from the N-point DFT unit 214, the interference measurement unit 215 measures the level of a noise signal and an interference signal that affect the signal of the first transmitter 10. Similarly, the interference measurement unit 215 measures the level of a noise signal and an interference signal that affect the signal of the second transmitter 11. The interference measurement unit 215 outputs, to the equalization processing unit 212, these measurement results that are the measured interference values.

Figure 12:
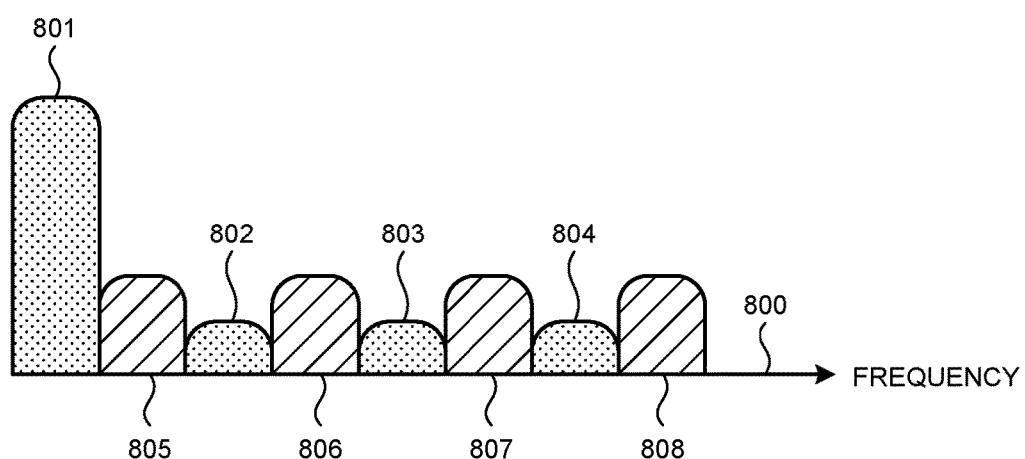
FIG. 12 is a diagram illustrating an image of the frequency domain signals corresponding to a result of the processing performed by the sequence multiplication unit 213 according to the first embodiment on the basis of the second phase rotation sequence corresponding to the first transmitter 10.
Figure 13:
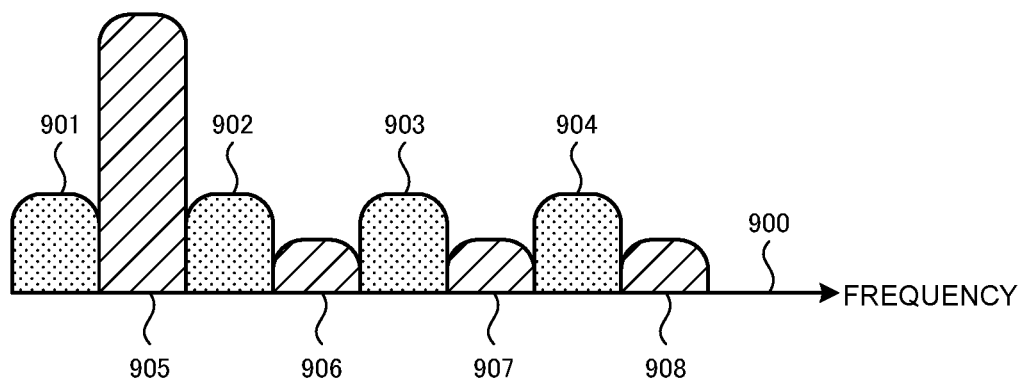
FIG. 13 is a diagram illustrating an image of the frequency domain signals corresponding to a result of the processing performed by the sequence multiplication unit 213 according to the first embodiment on the basis of the second phase rotation sequence corresponding to the second transmitter 11.

FIGS. 12 and 13 illustrate images of the frequency domain signals for two systems that are passed to the interference measurement unit 215. FIG. 12 is a diagram illustrating an image of the frequency domain signals corresponding to a result of the processing performed by the sequence multiplication unit 213 according to the first embodiment on the basis of the second phase rotation sequence corresponding to the first transmitter 10. In FIG. 12, frequency domain signals 801 to 808 on a frequency axis 800 indicate the frequency domain signals passed from the N-point DFT unit 214 to the interference measurement unit 215. The frequency domain signals 801 to 804 correspond to the frequencies used by the first transmitter 10 for transmission, and the frequency domain signals 805 to 808 correspond to the frequencies used by the second transmitter 11 for transmission. Similarly, FIG. 13 is a diagram illustrating an image of the frequency domain signals corresponding to a result of the processing performed by the sequence multiplication unit 213 according to the first embodiment on the basis of the second phase rotation sequence corresponding to the second transmitter 11. In FIG. 13, frequency domain signals 901 to 908 on a frequency axis 900 indicate the frequency domain signals passed from the N-point DFT unit 214 to the interference measurement unit 215. The frequency domain signals 901 to 904 correspond to the frequencies used by the first transmitter 10 for transmission, and the frequency domain signals 905 to 908 correspond to the frequencies used by the second transmitter 11 for transmission.

As described above, the known-signal generation unit 114 of the transmitter generates a signal equivalent to that which is generated when the parameter of k=0 is given to the phase rotation sequence generation unit 110. Moreover, the frequency shift unit 112 of the transmission unit 100 of the first transmitter 10 uses θ=0, and the frequency shift unit 112 of the transmission unit 100 of the second transmitter 11 uses θ=1. The frequency domain signal input to the interference measurement unit 215 is the received known signal having its distortion caused by the wireless transmission path but corrected by the temporary equalization coefficient in the equalization processing unit 212, the received known signal having the component of the second phase rotation sequence removed by the sequence multiplication unit 213. That is, only the frequency modulated signal component corresponding to k=0 selected in the known-signal generation unit 114 remains. Since FIG. 12 illustrates the result of the processing based on the second phase rotation sequence corresponding to the first transmitter 10, the frequency domain signal 801 is the frequency modulated signal component corresponding to the first transmitter 10. Similarly, since FIG. 13 illustrates the result of the processing based on the second phase rotation sequence corresponding to the second transmitter 11, the frequency domain signal 905 is the frequency modulated signal component corresponding to the second transmitter 11.

In the actual environment, the received signal includes noise added in the high-frequency reception processing unit 202, and interference due to, for example, a frequency error between the first transmitter 10 and the second transmitter 11. The noise component is typically superimposed with uniform average power with respect to the frequency. The influence of the interference between the first transmitter 10 and the second transmitter 11 due to the frequency error causes their frequency components to shift on the frequency axis. That is, in the example illustrated in FIG. 12, the signal component of the frequency corresponding to the frequency domain signals 805 to 808 used by the second transmitter 11 leaks by the amount corresponding to the frequency error, into the frequency corresponding to the frequency domain signals 801 to 804 used by the first transmitter 10. The interference measurement unit 215 calculates the measured interference value for the frequency domain signals on the basis of the signal of the frequency other than the frequency including the transmit signal component. Specifically, the interference measurement unit 215 calculates an average power value of the signal observed at the frequencies corresponding to the frequency domain signals 802 to 804 illustrated in FIG. 12 with respect to an input signal corresponding to each of the known signals 400 to 403, and further calculates a value obtained by performing time-averaging on the known signals 400 to 403 as the level of a noise signal and an interference signal affecting the signal of the first transmitter 10. Similarly, the interference measurement unit 215 calculates an average power value of the signal observed at the frequencies corresponding to the frequency domain signals 906 to 908 illustrated in FIG. 13 with respect to the input signal corresponding to each of the known signals 400 to 403, and further calculates a value obtained by performing time-averaging on the known signals 400 to 403 as the level of a noise signal and an interference signal affecting the signal of the second transmitter 11.

The measured interference values of the two systems passed from the interference measurement unit 215 to the equalization processing unit 212 are input to the equalization coefficient calculation unit 252. The equalization coefficient calculation unit 252 calculates equalization coefficients (step S48) by using the measured interference values, the estimated transmission line value in the frequency domain for the first transmitter 10, and the estimated transmission line value in the frequency domain for the second transmitter 11, the estimated transmission line value being averaged among the known signals 400 to 403 and input into the equalization coefficient calculation unit 252 by the previous processing in the transmission line estimation unit 251. The calculated equalization coefficients are to be used to correct the waveform distortion of the data signals. Where a character "wd" represents the equalization coefficient, a character "a" represents the measured interference value, and the character "h" represents the estimated transmission line value in the frequency domain, the equalization coefficient calculation unit 252 can calculate the equalization coefficients from a calculation formula of $wd=h^*/(|h|^2+a)$ by processing based on a generally known minimum mean square error criterion, for example. The equalization coefficient calculation unit 252 outputs the equalization coefficients to the distortion correction unit 253.

Using the equalization coefficient for the first transmitter 10 and the equalization coefficient for the second transmitter 11 obtained by the above processing, the reception unit 200 performs determination processing on the data signals. Hereinafter, the determination processing on the data signals for the first transmitter 10 will be described as an example.

When the received data signal is passed from the CP removing unit 211 to the equalization processing unit 212, the distribution unit 250 passes the received data signal to the distortion correction unit 253. The distortion correction unit 253 performs an N-point discrete Fourier transform on the received data signal to thereby obtain a received data signal in the frequency domain. The distortion correction unit 253 performs equalization processing by multiplying the received data signal in the frequency domain by the equalization coefficient passed from the equalization coefficient calculation unit 252 (step S49). The distortion correction unit 253 performs an N-point inverse discrete Fourier transform on a result of the equalization processing, and outputs a post-equalization received data signal to the sequence multiplication unit 213. The post-equalization received data signal to be output from distortion correction unit 253 is the equalization processing result subjected to the N-point inverse discrete Fourier transform.

The sequence multiplication unit 213 multiplies the post-equalization received data signal passed from the distortion correction unit 253, by the complex conjugate of the second phase rotation sequence corresponding to r=1 used in the first transmitter 10 (step S50). The sequence multiplication unit 213 multiplies the post-equalization received data signal by the complex conjugate of the second phase rotation sequence repeatedly L times, as in the case of processing the received known signal as described above. The sequence multiplication unit 213 outputs the processing result to the N-point DFT unit 214.

The N-point DFT unit 214 performs an N-point discrete Fourier transform on the processing result passed from the sequence multiplication unit 213, that is, the received data signal (step S51). The N-point DFT unit 214 outputs, to the determination unit 216, frequency domain signals obtained by performing the discrete Fourier transform.

The determination unit 216 performs signal determination on the basis of the frequency domain signals. Specifically, the determination unit 216 selects, for the frequency domain signals, the frequency providing the largest signal power from among the frequencies ("M" frequencies) used by the first transmitter 10 illustrated in FIG. 7. The frequency selected by the determination unit 216 corresponds to the parameter "k" associated with the encoded bits and used in the phase rotation sequence generation unit 110 of the transmission unit 100. The determination unit 216 estimates the encoded bits on the basis of the correspondence between the encoded bits and the parameter "k" (step S52). The determination unit 216 outputs the estimated value of the encoded bits to the decoding unit 205. Note that instead of the processing performed by the determination unit 216 for selecting the frequency providing the largest signal power, for example, processing of selecting the frequency providing the largest amplitude value may be performed by the determination unit 216. Moreover, any method may be used as long as the processing is useful as a method of estimating the frequency modulated signals transmitted as the data signals by the first transmitter 10 and the second transmitter 11, and the processing performed by the determination unit 216 for selecting the frequency is not limited to the above.

The decoding unit 205 performs decoding processing corresponding to the error correction code employed by the encoding unit 101 of the transmission unit 100, and obtains final decoded bits.

Next, a hardware configuration of the transmission unit 100 of the transmitter will be described. In the transmission unit 100, the transmission filter 103 and the high-frequency transmission processing unit 104 are implemented by a transmission device. The transmitting antenna 105 is implemented by an antenna device. The encoding unit 101 and the transmit signal generation unit 102 are implemented by a processing circuit. The processing circuit may be a memory and a processor executing programs stored in the memory, or may be dedicated hardware.

Figure 14:
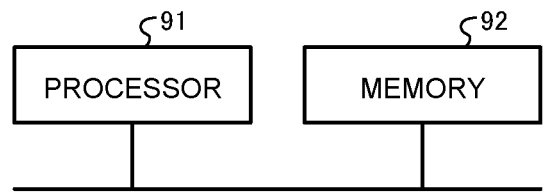
FIG. 14 is a diagram illustrating an example in which a processing circuit of the transmission unit according to the first embodiment includes a processor and a memory.

FIG. 14 is a diagram illustrating an example in which the processing circuit of the transmission unit 100 according to the first embodiment includes the processor and the memory. Where the processing circuit includes a processor 91 and a memory 92, each function of the processing circuit of the transmission unit 100 is implemented by software, firmware, or a combination of software and firmware. The software or firmware is described as programs and stored in the memory 92. The processing circuit implements each function by the processor 91 reading and executing the programs stored in the memory 92. That is, the processing circuit includes the memory 92 for storing the programs that result in the execution of the processing of the encoding unit 101 and the transmit signal generation unit 102. It can also be said that these programs cause a computer to execute procedures and methods of the transmission unit 100.

Here, the processor 91 may be a central processing unit (CPU), a processing unit, an arithmetic unit, a microprocessor, a microcomputer, a digital signal processor (DSP), or the like. The memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, a digital versatile disc (DVD), or the like.

Figure 15:
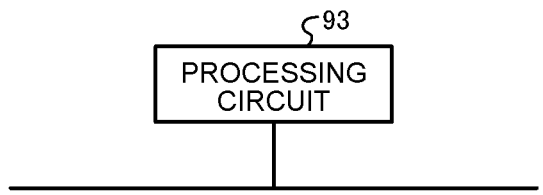
FIG. 15 is a diagram illustrating an example in which the processing circuit of the transmission unit according to the first embodiment includes dedicated hardware.

FIG. 15 is a diagram illustrating an example in which the processing circuit of the transmission unit 100 according to the first embodiment includes the dedicated hardware. Where the processing circuit includes the dedicated hardware, a processing circuit 93 illustrated in FIG. 15 corresponds to a single circuit, a complex circuit, a programmed processor, a parallel-programmed processor, an application specific integrated circuit (ASIC), a field programmable gate array (FPGA), or a combination of those, for example. The functions of the transmission unit 100 may be implemented individually or collectively by the processing circuit 93.

Note that the functions of the transmission unit 100 may be implemented partly by dedicated hardware and partly by software or firmware. The processing circuit can thus implement the aforementioned functions by the dedicated hardware, software, firmware, or a combination of these.

Next, a hardware configuration of the reception unit 200 of the receiver 20 will be described. In the reception unit 200, the receiving antenna 201 is implemented by an antenna device. The high-frequency reception processing unit 202 and the reception filter 203 are implemented by a receiving device. The demodulation processing unit 204 and the decoding unit 205 are implemented by a processing circuit. The processing circuit has the configuration illustrated in FIG. 14 or 15 as with the processing circuit of the transmission unit 100.

As described above, in the transmit signal generation unit 102 of each of the first transmitter 10 and the second transmitter 11 according to the present embodiment, the phase rotation sequence generation unit 110 generates the known signals and the data signals, using the phase rotation sequence in which the frequency response has a bandwidth. The up-sampling unit 111 replicates the phase rotation sequence, multiplying the sample rate by the predetermined coefficient "L". Using different parameters for different transmitters, the frequency shift unit 112 arranges the transmission spectra such that the transmission spectra do not overlap on the frequency axis. The phase rotation sequence is a signal with high power efficiency because of having no amplitude fluctuation. The transmit signal generation unit 102 can generate the transmit signal only by performing such signal processing as signal copying and phase shifting that does not change the high power efficiency characteristics of the phase rotation sequence. As a result, the first transmitter 10 and the second transmitter 11 can reduce the back-off set in the amplifier as well as reducing deterioration of the communication quality due to interference. As a result, the first transmitter 10 and the second transmitter 11 can contribute to extension of the range of wireless communication.

Moreover, the transmit signal generation unit 102 can arrange the transmit signal of the first transmitter 10 and the transmit signal of the second transmitter 11 alternately on the frequency axis. As a result, even under a condition in which a signal of a transmitter with a long communication range cannot be demodulated due to the near-far problem as in the related art, the receiver 20 can distinguish signals transmitted from different transmitters on the frequency axis and can thus achieve good communication performance.

Moreover, in the present embodiment, the first transmitter 10 and the second transmitter 11 generate the transmit signals, using the frequency modulated signal and the phase rotation sequence in which the frequency component changes with time. As a result, the demodulation processing unit 204 of the receiver 20 can perform interference measurement, using signal processing on the frequency axis, and calculate the equalization coefficient. This enables the receiver 20 to stably achieve good communication quality even in a situation where transmit signals from different transmitters interfere with each other.

In general, a mere frequency modulated signal, that is, a phase rotation sequence having only a single frequency component, does not result in a change in frequency even when up-sampling is performed, and hence the signals with the alternating frequency arrangement as in the present embodiment cannot be obtained. It is possible to generate signals with an alternating frequency arrangement by synthesizing a plurality of different single frequency modulated signals with an alternating frequency arrangement, but the signals have a waveform like that of signals used in so-called orthogonal frequency division multiplexing (OFDM) and do not have high power efficiency. Since the first transmitter 10 and the second transmitter 11 in the present embodiment generate the frequency modulated signal, using the phase rotation sequence in which the frequency response has a bandwidth, it becomes possible to generate the signals with the alternating frequency arrangement as well as to maintain high power efficiency. Although it is possible to generate signals with an alternating frequency arrangement even by performing up-sampling and frequency shift on a signal generated using a typical binary sequence or the like, namely, it is possible to achieve user multiplexing on the frequency using the alternating frequency arrangement, the receiver 20 cannot easily estimate an interference signal component of another user leaking into its own frequency, as described with reference to FIG. 12 and the like, unlike the present embodiment providing the signals having the alternating frequency arrangement generated on the basis of frequency modulation. The effect that the receiver 20 can easily estimate the interference signal component is due to the fact that the first transmitter 10 and the second transmitter 11 generate the signals having the alternating frequency arrangement on the basis of frequency modulation.

Note that although the encoding unit 101 generates the signal that is to be input to the transmit signal generation unit 102, and the signal output by the demodulation processing unit 204 is decoded by the decoding unit 205 in the present embodiment, the configuration thereof is not limited to this example. The encoding unit 101 and the decoding unit 205 are not essential components, and the transmit signal generation unit 102 and the demodulation processing unit 204 are applicable where an error correction code is not applied.

Moreover, the transmission line estimation unit 251 and the distortion correction unit 253 in the present embodiment independently perform the N-point discrete Fourier transform on the output of the distribution unit 250, but is not limited to such a configuration. For example, the distribution unit 250 may be configured to perform a single N-point discrete Fourier transform, and a signal in the frequency domain may be passed to the transmission line estimation unit 251 and the distortion correction unit 253. This can simplify the circuit configuration of the demodulation processing unit 204.

Moreover, the transmit signal generation unit 102 of the present embodiment uses the signal represented by the expression of $\exp(j\pi \times r \times m \times m/M)$ as the second phase rotation sequence c (m), but any signal may be used as long as the sequence has a bandwidth and a small amplitude fluctuation.

Moreover, in the present embodiment, the phase rotation θ used in each of the first transmitter 10 and the second transmitter 11 is fixedly assigned, but can be switched in a predetermined order. As a result, transmission is performed switching the frequencies assigned to the transmitters, whereby an improvement in the communication quality such as frequency diversity and interference avoidance can be achieved. Also, as another way of assigning the phase rotation θ to each transmitter, a control may be performed to assign the phase rotation θ such that a signal to interference and noise power ratio (SINR) increases for each transmitter.

Moreover, the present embodiment has described the wireless communication system 30 in which the plurality of transmitters simultaneously communicates with the one receiver 20 as an example, but a wireless communication system to which the present invention is applied is not limited thereto. For example, the present invention may be applied to a wireless communication system in which only one transmitter and one receiver communicate simultaneously.

Moreover, in the present embodiment, the measured interference value measured by the interference measurement unit 215 is reflected in the calculation of the equalization coefficient by the equalization processing unit 212, but the method of utilizing the measured interference value is not limited thereto. For example, when calculating the estimated value of the encoded bits, the determination unit 216 may calculate a soft decision value indicating the reliability of the estimated value, and the measured interference value may be reflected in the calculation of the soft decision value.

Second Embodiment

In a second embodiment, the interference measurement unit of the receiver 20 uses data signals in addition to known signals when calculating a measured interference value. Differences from the first embodiment will be described.

Figure 16:
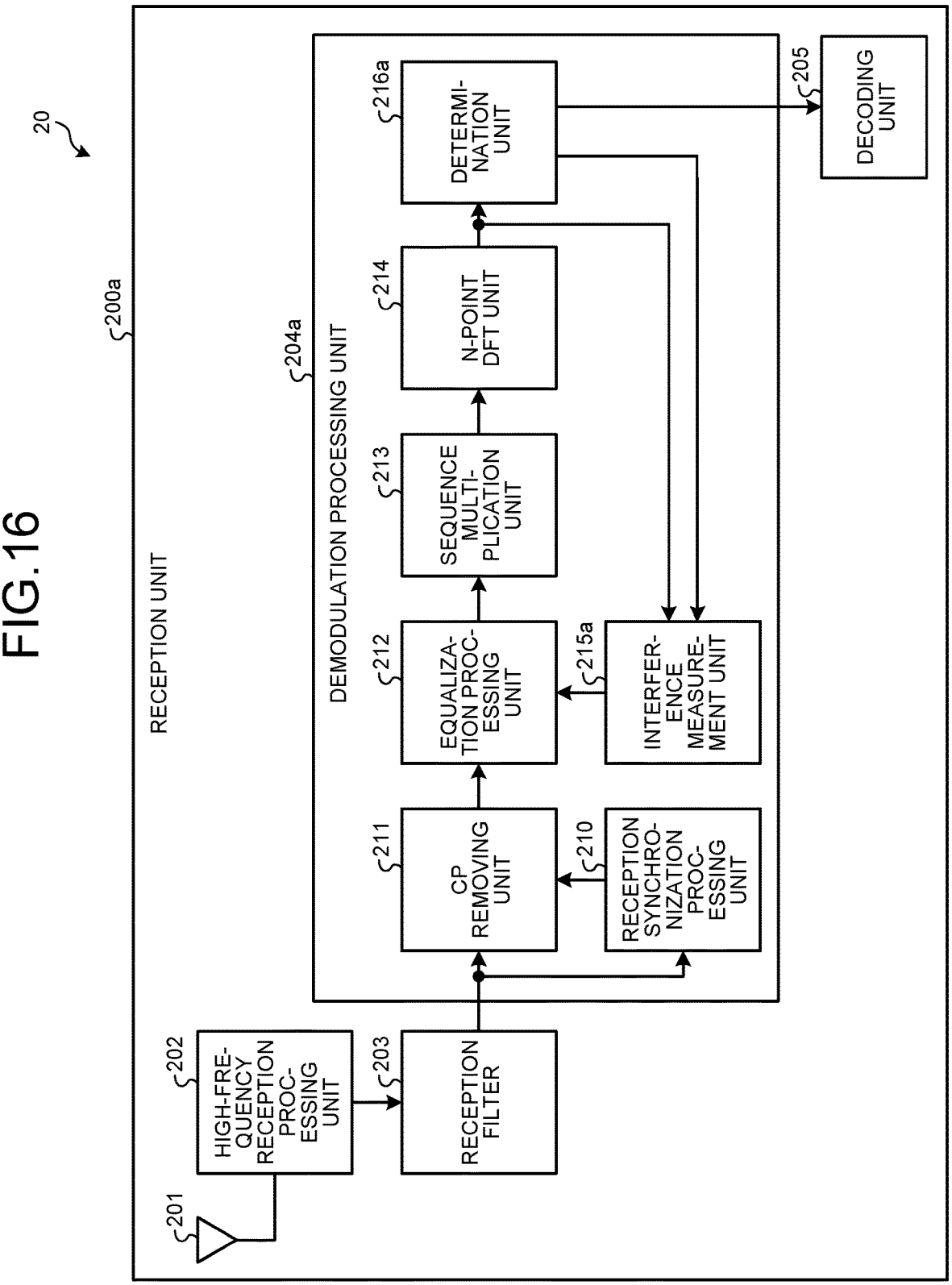
FIG. 16 is a diagram illustrating an example of the configuration of a reception unit of the receiver according to a second embodiment.

In the second embodiment, the configuration of the wireless communication system 30 is similar to that of the wireless communication system 30 of the first embodiment illustrated in FIG. 1. In the second embodiment, the configuration of a reception unit of the receiver 20 is different from the configuration of the reception unit 200 of the first embodiment illustrated in FIG. 8. FIG. 16 is a diagram illustrating an example of the configuration of a reception unit 200a of the receiver 20 according to the second embodiment. The reception unit 200a differs from the reception unit 200 of the first embodiment illustrated in FIG. 8 in that the demodulation processing unit 204 is replaced with a demodulation processing unit 204a. The demodulation processing unit 204a differs from the demodulation processing unit 204 of the first embodiment illustrated in FIG. 8 in that the interference measurement unit 215 and the determination unit 216 are replaced with an interference measurement unit 215a and a determination unit 216a.

The receiver 20 of the second embodiment performs processing on a known signal in a manner similar to that of the first embodiment. The determination unit 216a estimates a frequency modulated signal transmitted as a data signal by performing processing similar to that of the first embodiment on a received data signal, and outputs corresponding encoded bits to the decoding unit 205. At the same time, the determination unit 216a outputs information on the frequency corresponding to the estimated frequency modulated signal to the interference measurement unit 215a.

The interference measurement unit 215a receives, from the N-point DFT unit 214, a frequency domain signal corresponding to the received data signal, and further receives, from the determination unit 216a, the information on the frequency corresponding to the estimated frequency modulated signal. The interference measurement unit 215a performs processing of calculating a measured interference value, using the received data signal on the basis of the received pieces of information. Specifically, the interference measurement unit 215a calculates an average power value of signals of "M−1" different frequencies among "M" different frequencies used for transmission by the transmitter subjected to processing, the "M−1" different frequencies excluding the frequency whose information is passed from the determination unit 216a. The interference measurement unit 215a uses the calculated average power value of the signals of the "M−1" different frequencies to further perform averaging of that calculated average power value and the measured interference value that has been estimated by, for example, processing the known signal. The interference measurement unit 215a outputs the averaged measured interference value to the equalization processing unit 212. In the first embodiment, the interference measurement unit 215 calculates the measured interference value where the transmit signal component is the known signal. In the second embodiment, the interference measurement unit 215a can calculate the measured interference value not only where the transmit signal component is the known signal but also where the transmit signal component is the data signal.

The equalization processing unit 212 recalculates the equalization coefficient, using the averaged measured interference value passed from the interference measurement unit 215a, and applies it to subsequent data signal equalization processing.

Figure 17:
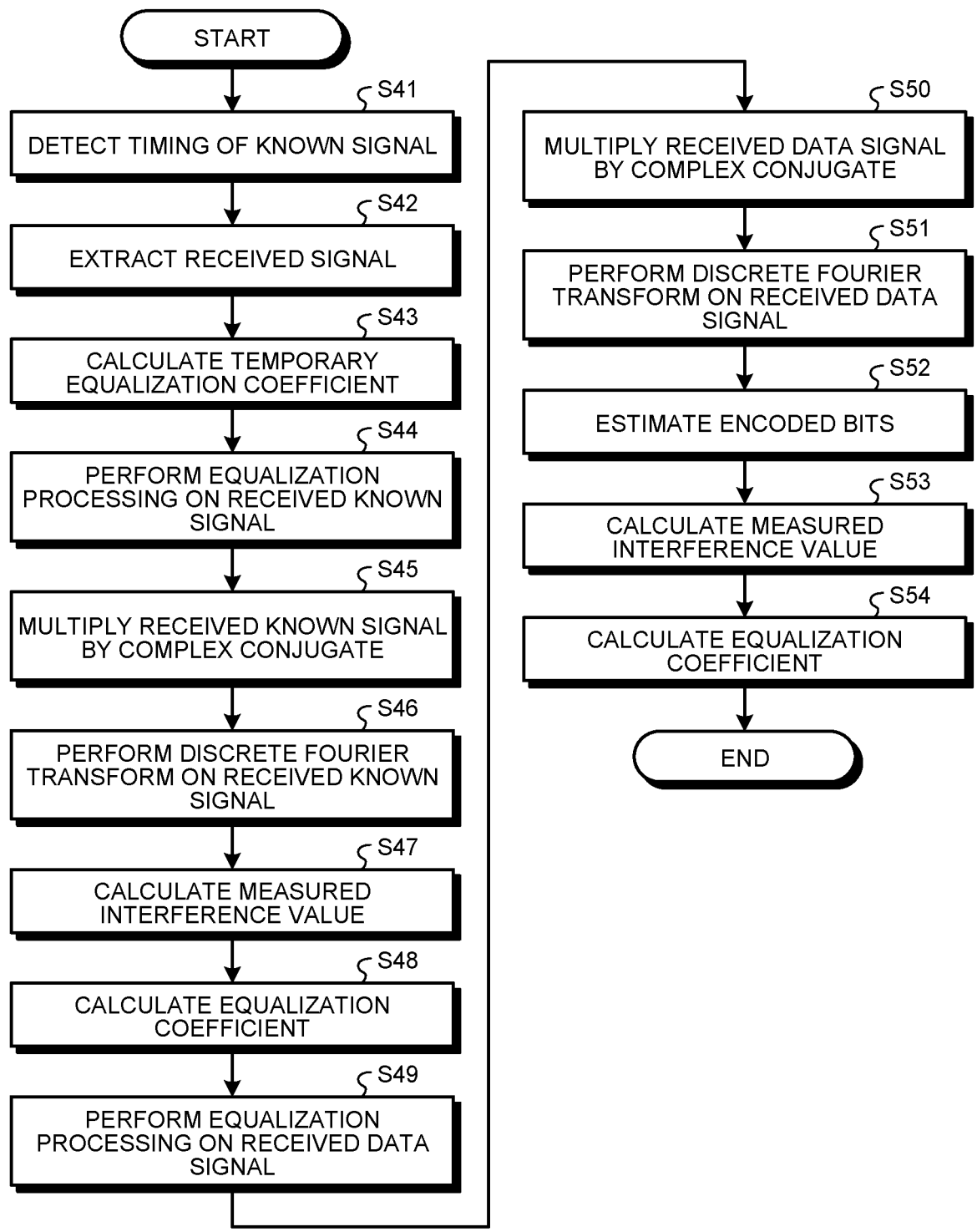
FIG. 17 is a flowchart illustrating an operation of generating an estimated value of encoded bits by a demodulation processing unit according to the second embodiment.

FIG. 17 is a flowchart illustrating an operation of generating an estimated value of the encoded bits by the demodulation processing unit 204a according to the second embodiment. The processing up to step S52 is similar to that in the first embodiment illustrated in FIG. 10. Using the frequency domain signal for the received data signal passed from the N-point DFT unit 214 and the information on the frequency corresponding to the estimated frequency modulated signal passed from the determination unit 216a, the interference measurement unit 215a of the demodulation processing unit 204a calculates the measured interference value that uses the received data signal (step S53). The equalization processing unit 212 calculates the equalization coefficient, using the measured interference value averaged (step S54).

As described above, according to the present embodiment, the interference measurement unit 215a of the receiver 20 can perform the processing of calculating the measured interference value with respect to the data signal in addition to the known signal. This increases the accuracy of calculating the measured interference value in the receiver 20, and can achieve better communication performance than the first embodiment.

Note that although, in the present embodiment, the interference measurement unit 215a averages the two different measured interference values: the measured interference value that is calculated in the past in processing, for example, the known signal; and the measured interference value that is newly calculated for the data signal, the interference measurement unit 215a is not limited to such a configuration. The interference measurement unit 215a may, for example, be configured to replace the measured interference value with the latest measured interference value that is newly calculated for the data signal without averaging and the past measured interference value and the measured interference value newly calculated for the data signal. Such a configuration is suitable in an environment where the state of interference received at the receiver 20 changes momentarily, because the receiver 20 can achieve stable communication in accordance with the environment. The receiver 20 can also be configured to control the estimation accuracy and the speed of following the environmental change by adjusting a time constant or the like used for averaging.

Third Embodiment

In a third embodiment, the circuit scale of the receiver 20 is reduced as compared to that of the first and second embodiments. Differences from the first and second embodiments will be described.

Figure 18:
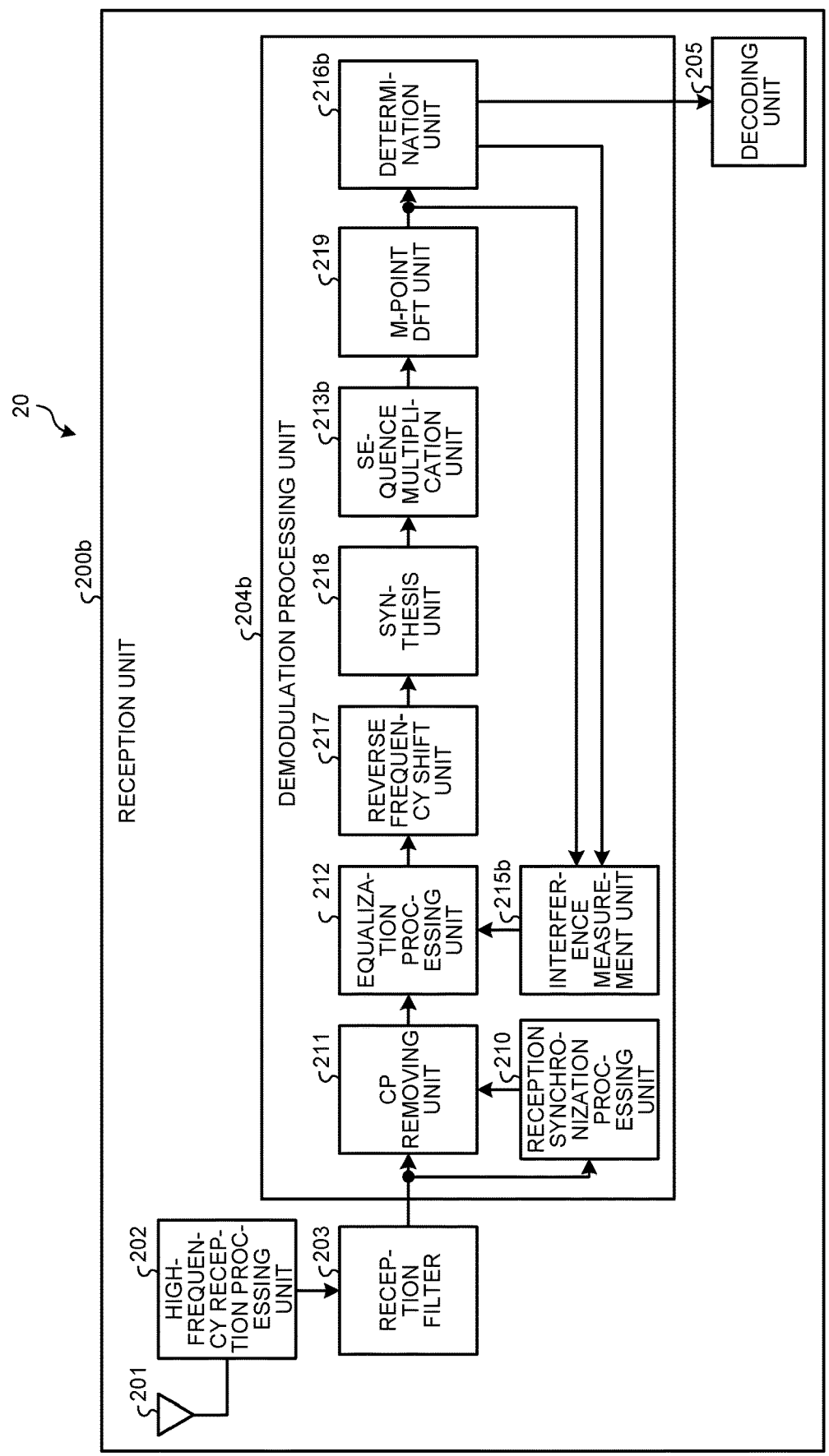
FIG. 18 is a diagram illustrating an example of the configuration of a reception unit of the receiver according to a third embodiment.

In the third embodiment, the configuration of the wireless communication system 30 is similar to that of the wireless communication system 30 of the first embodiment illustrated in FIG. 1. In the third embodiment, the configuration of a reception unit of the receiver 20 is different from the configuration of the reception unit 200 of the first embodiment illustrated in FIG. 8. FIG. 18 is a diagram illustrating an example of the configuration of a reception unit 200b of the receiver 20 according to the third embodiment. The reception unit 200b differs from the reception unit 200 of the first embodiment illustrated in FIG. 8 in that the demodulation processing unit 204 is replaced with a demodulation processing unit 204b. The demodulation processing unit 204b differs from the demodulation processing unit 204 of the first embodiment illustrated in FIG. 8 in that the sequence multiplication unit 213, the N-point DFT unit 214, the interference measurement unit 215, and the determination unit 216 are deleted, and a sequence multiplication unit 213b, an interference measurement unit 215b, a determination unit 216b, a reverse frequency shift unit 217, a synthesis unit 218, and an M-point DFT unit 219 are added. In the third embodiment, using the M-point DFT unit 219 enables processing to be performed reducing the circuit scale.

In the demodulation processing unit 204b, the processing from the reception synchronization processing unit 210 to the equalization processing unit 212 is similar to that of the first and second embodiments. The equalization processing unit 212 outputs the post-equalization received signal to the reverse frequency shift unit 217.

The reverse frequency shift unit 217 performs processing of removing, from the signal received from the transmitter, the amount of shift of the frequency component occurred in the transmitter. That is, the reverse frequency shift unit 217 performs a frequency shift in a direction opposite to the frequency shift that is performed by the frequency shift unit 112 of the transmit signal generation unit 102 on the frequency axis. Specifically, the reverse frequency shift unit 217 performs processing of applying phase rotation −θ corresponding to reverse rotation with respect to the phase rotation θ used in the frequency shift unit 112. Note that the first transmitter 10 and the second transmitter 11 differ in a value of the phase rotation θ. Therefore, the reverse frequency shift unit 217 selects the value of the phase rotation θ in accordance with the transmitter relevant to which the processing is to be performed. For example, the reverse frequency shift unit 217 selects the phase rotation of θ=0 when performing the processing relevant to the first transmitter 10 and selects the phase rotation of θ=1 when performing the processing relevant to the second transmitter 11, such that the reverse frequency shift unit 217 performs the processing of applying the phase rotation value obtained by reversing the sign of the phase rotation θ. When both the processing relevant to the first transmitter 10 and the processing relevant to the second transmitter 11 need to be performed, the reverse frequency shift unit 217 independently performs each of the processing in the case of the phase rotation of θ=0 and the processing in the case of the phase rotation of θ=1, and outputs the processing results for two systems. The reverse frequency shift unit 217 outputs the processing results to the synthesis unit 218.

The synthesis unit 218 synthesizes samples of the processing results passed from the reverse frequency shift unit 217. As described in the first embodiment, the up-sampling unit 111 of the transmit signal generation unit 102 performs replication processing of multiplying the number of samples "M" of the phase rotation sequence by "L". The synthesis unit 218 adds up the same sample values of the samples replicated by the up-sampling unit 111. That is, the synthesis unit 218 performs processing of synthesizing the phase rotation sequences replicated by the transmitter. The description of the up-sampling unit 111 of the first embodiment gives the example providing the correspondence of y (0)=x (0), y (1)=x (1), y (2)=x (2), y (3)=x (3), y (4)=x (0), y (5)=x (1), y (6)=x (2), and y (7)=x (3). That is, the signal of the sample number "0" and the signal of the sample number "4" have the same sample values, the signal of the sample number "1" and the signal of the sample number "5" have the same sample values, the signal of the sample number "2" and the signal of the sample number "6" have the same sample values, and the signal of the sample number "3" and the signal of the sample number "7" have the same sample values. From this correspondence, the synthesis unit 218 adds the sample numbers "0" and "4", the sample numbers "1" and "5", the sample numbers "2" and "6", and the sample numbers "3" and "7" of the input signals, such that the synthesis unit 218 generates, from the signal sequence having eight samples, a new signal sequence having four samples. That is, the synthesis unit 218 generates, from an input signal having the number of samples of "N", an output signal having the number of samples of "M". The synthesis unit 218 outputs the synthesized processing result to the sequence multiplication unit 213b.

Similar to the processing performed by the sequence multiplication unit 213 of the first and second embodiments, the sequence multiplication unit 213b of the third embodiment performs processing of multiplying the processing result, i.e., the synthesized signal input from the synthesis unit 218, by the complex conjugate of the second phase rotation sequence corresponding to the transmitter relevant to the processing. Unlike the sequence multiplication unit 213 of the first and second embodiments, the number of samples of the processing result that is the input signal passed from the synthesis unit 218 is "M" that is equal to the number of samples of the second phase rotation sequence. Therefore, the sequence multiplication unit 213b does not need to perform the multiplication repeatedly "L" times. The sequence multiplication unit 213b outputs the processing result to the M-point DFT unit 219.

The M-point DFT unit 219 acting as a discrete Fourier transform unit performs an M-point discrete Fourier transform on the processing result passed from the sequence multiplication unit 213b, and generates frequency domain signals. At the time of processing the known signals 400 to 403, the M-point DFT unit 219 outputs, to the interference measurement unit 215b, the frequency domain signals obtained by performing the discrete Fourier transform. At the time of processing the data signals 404 to 415, the M-point DFT unit 219 outputs, to the determination unit 216b and the interference measurement unit 215b, the frequency domain signals obtained by performing the discrete Fourier transform.

On the basis of the frequency domain signals passed from the M-point DFT unit 219, the determination unit 216b estimates frequency modulated signals transmitted as the data signals, such that the determination unit 216b outputs an estimated value of corresponding encoded bits to the decoding unit 205 and outputs information on the estimated frequency to the interference measurement unit 215b.

Figure 19:
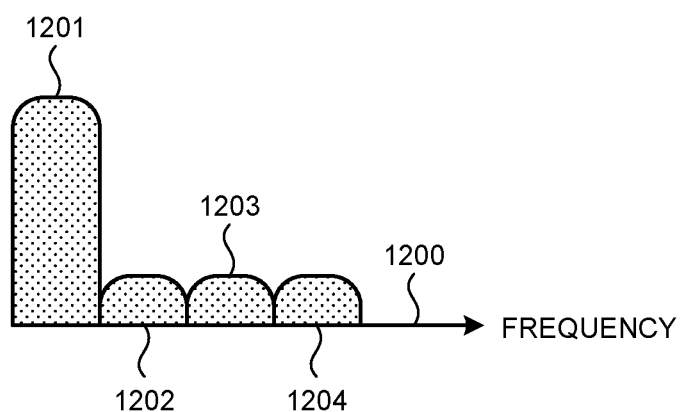
FIG. 19 is a diagram illustrating an image of frequency domain signals input to an interference measurement unit according to the third embodiment.

The interference measurement unit 215b performs processing similar to that of the interference measurement unit 215a of the second embodiment illustrated in FIG. 16, but different therefrom in that the number of samples of the frequency domain signals input is equal to "M". Accordingly, it is not required that the interference measurement unit 215b perform the processing of selecting the frequency to observe because the frequencies used for transmission by the first transmitter 10 and the frequencies used for transmission by the second transmitter 11 as described with reference to FIGS. 12 and 13 are input at the same time. FIG. 19 is a diagram illustrating an image of the frequency domain signals input to the interference measurement unit 215b according to the third embodiment. In FIG. 19, frequency domain signals 1201 to 1204 on a frequency axis 1200 indicate M frequency signals. For example, when the reverse frequency shift unit 217 and the sequence multiplication unit 213b perform processing with parameters corresponding to the first transmitter 10, the frequency domain signals 1201 to 1204 illustrated in FIG. 19 all correspond to signals of the frequencies used for transmission by the first transmitter 10, and thus there is no signal related to the frequencies used for transmission by the second transmitter 11. Assuming that the frequency domain signal 1201 corresponds to the frequency used in the frequency modulation, the interference measurement unit 215b calculates an average value of the signal power of the frequency domain signals 1202 to 1204 and outputs the calculated one as a measured interference value affecting the signal of the first transmitter 10. Also, when a signal processed with parameters corresponding to the second transmitter 11 is input, the interference measurement unit 215b obtains a signal by the similar processing and outputs such a signal as a measured interference value affecting the signal of the second transmitter 11.

Figure 20:
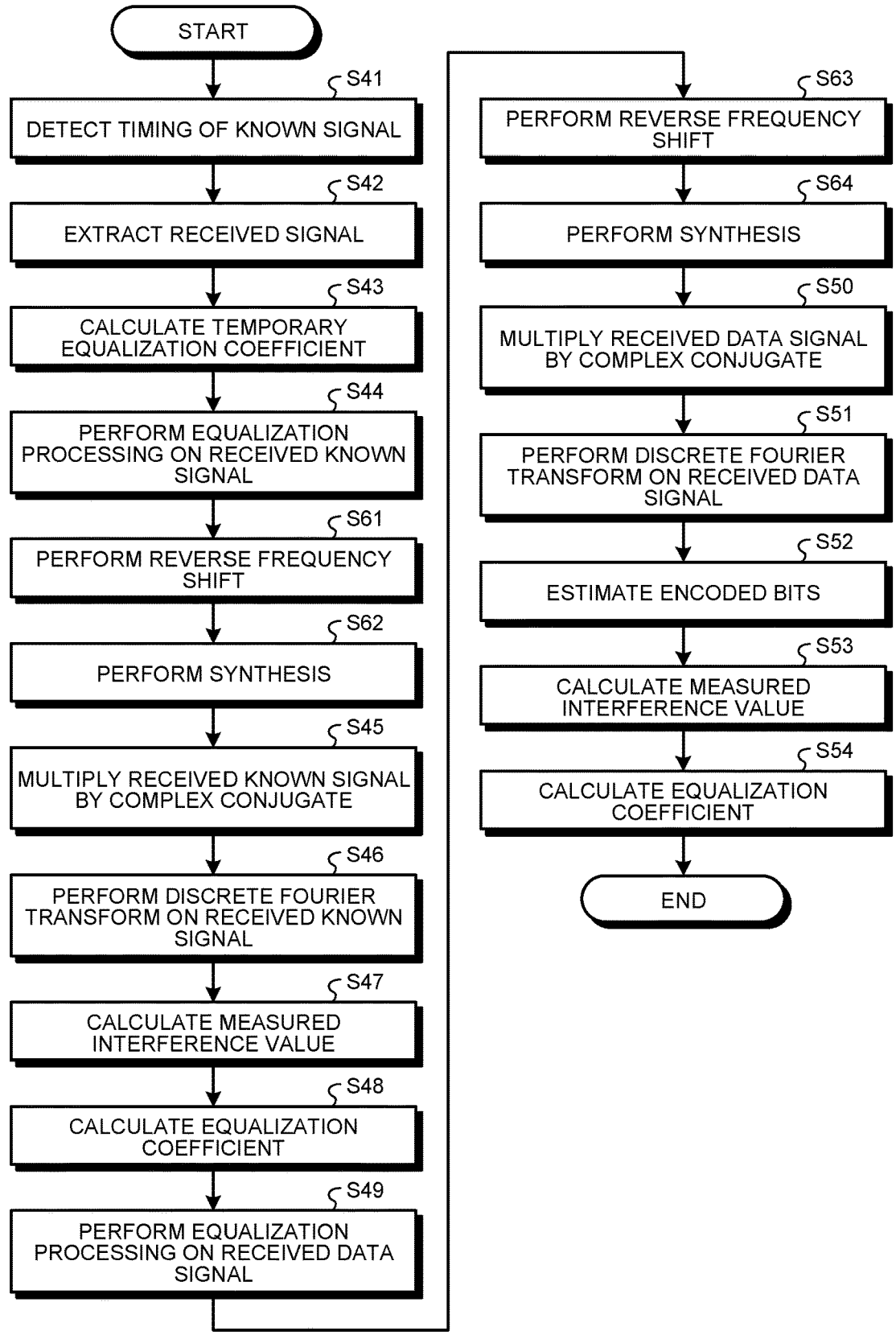
FIG. 20 is a flowchart illustrating an operation of generating an estimated value of encoded bits by a demodulation processing unit according to the third embodiment.

FIG. 20 is a flowchart illustrating an operation of generating the estimated value of the encoded bits by the demodulation processing unit 204b according to the third embodiment. In the third embodiment, after the processing by the equalization processing unit 212 in step S44, the reverse frequency shift unit 217 performs a frequency shift on the frequency axis in a direction opposite to the frequency shift performed by the frequency shift unit 112 of the transmit signal generation unit 102 (step S61). The synthesis unit 218 synthesizes samples of the processing result passed from the reverse frequency shift unit 217 (step S62). Similarly, in the third embodiment, after the processing by the equalization processing unit 212 in step S49, the reverse frequency shift unit 217 performs a frequency shift on the frequency axis in a direction opposite to the frequency shift performed by the frequency shift unit 112 of the transmit signal generation unit 102 (step S63). The synthesis unit 218 synthesizes samples of the processing result passed from the reverse frequency shift unit 217 (step S64).

As described above, according to the present embodiment, the demodulation processing unit 204b of the receiver 20 includes the reverse frequency shift unit 217, the synthesis unit 218, and the sequence multiplication unit 213b at the subsequent stage of the equalization processing unit 212, and performs the M-point DFT on the signal having "M" samples. Moreover, the determination unit 216b and the interference measurement unit 215b operate on the basis of the processing result of the M-point DFT. As a result, the receiver 20 can reduce the circuit scale of the discrete Fourier transform as compared to the first and second embodiments, and can reduce the complexity of the device.

Fourth Embodiment

In a fourth embodiment, the transmitter multiplexes a plurality of frequency modulated signals. Differences from the first to third embodiments will be described.

In the fourth embodiment, the configuration of the wireless communication system 30 is similar to that of the wireless communication system 30 of the first embodiment illustrated in FIG. 1. In the fourth embodiment, the configuration of a transmission unit of the first transmitter 10 and the second transmitter 11 is different from the configuration of the transmission unit 100 of the first embodiment illustrated in FIG. 2. Moreover, in the fourth embodiment, the configuration of a reception unit of the receiver 20 is different from the configuration of the reception unit 200 of the first embodiment illustrated in FIG. 8.

Figure 21:
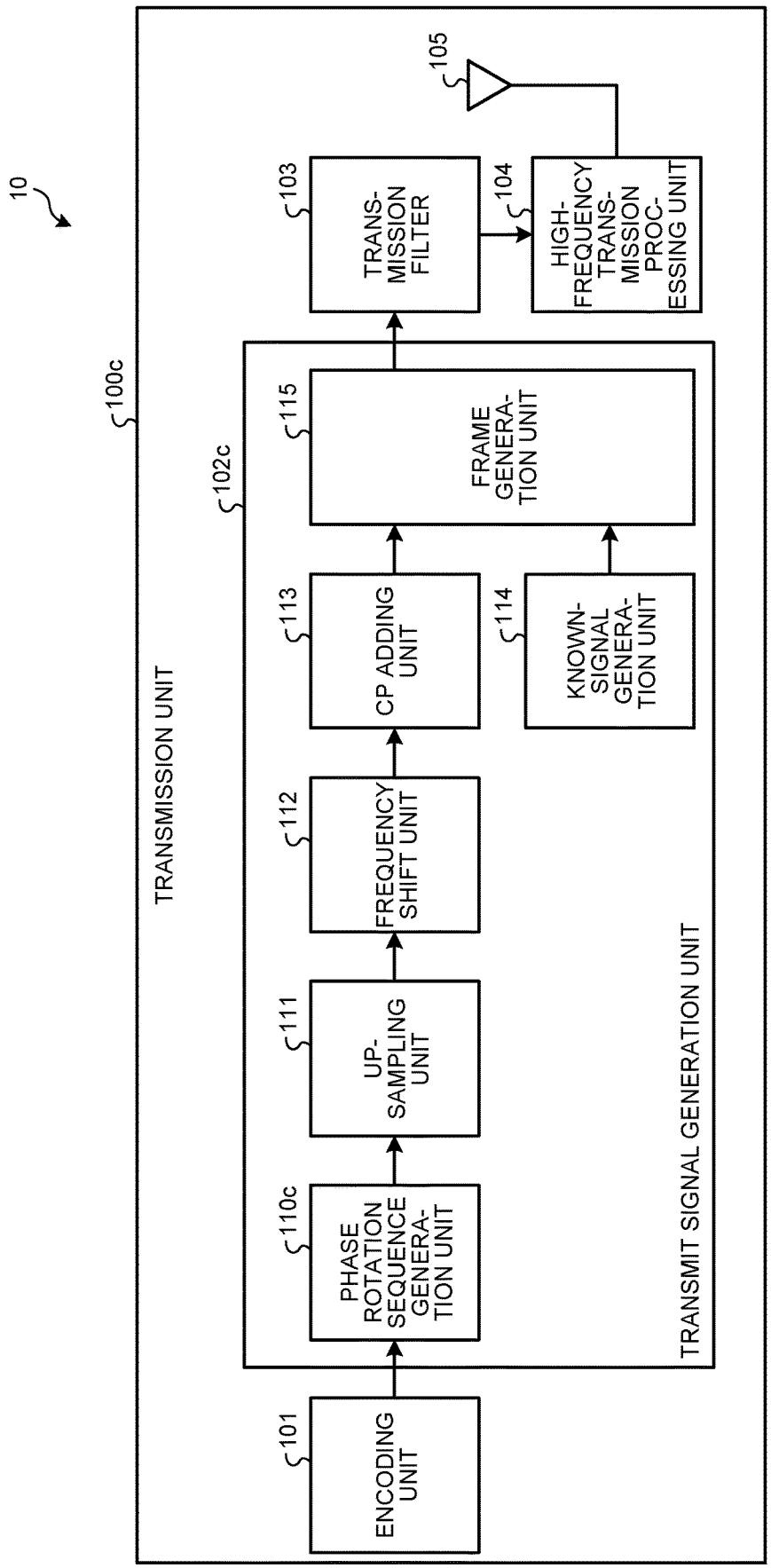
FIG. 21 is a diagram illustrating an example of the configuration of a transmission unit of each of the first transmitter and the second transmitter according to a fourth embodiment.

First, the configuration and operation of the transmission unit of each of the first transmitter 10 and the second transmitter 11 of the present embodiment will be described. FIG. 21 is a diagram illustrating an example of the configuration of a transmission unit 100c of each of the first transmitter 10 and the second transmitter 11 according to the fourth embodiment. The transmission unit 100c differs from the transmission unit 100 of the first embodiment illustrated in FIG. 2 in that the transmit signal generation unit 102 is replaced with a transmit signal generation unit 102c. The transmit signal generation unit 102c differs from the transmit signal generation unit 102 of the first embodiment illustrated in FIG. 2 in that the phase rotation sequence generation unit 110 is replaced with a phase rotation sequence generation unit 110c. In the present embodiment, the transmit signal generation unit 102c multiplexes a plurality of frequency modulated signals.

Upon receiving encoded bits from the encoding unit 101, the phase rotation sequence generation unit 110c generates a phase rotation sequence, using a first phase rotation sequence and a second phase rotation sequence. Specifically, the phase rotation sequence generation unit 110c generates the phase rotation sequence, using the first phase rotation sequence and the second phase rotation sequence, the first phase rotation sequence being a frequency modulated signal selecting one frequency out of "P" frequencies in accordance with the encoded bits, the second phase rotation sequence being a phase rotation sequence with the frequency component changing over time as in the first embodiment. The number of samples of the first phase rotation sequence is equal to the number of frequencies "P" that can be selected as the frequency modulated signal, and satisfies a relationship of 2×P=M where "M" represents the number of samples of the second phase rotation sequence. In the present embodiment, the following description will be made by way of example on the assumption that P is four (P=4) and M is eight (M=8).

Setting P=4 enables the frequency modulated signal used as the first phase rotation sequence to express two-bit information. Also, because of M=8, the number of samples for two first phase rotation sequences is equal to the number of samples for one second phase rotation sequence. That is, in the present embodiment, the sequence length of the first phase rotation sequence is shorter than the sequence length of the second phase rotation sequence. The phase rotation sequence generation unit 110c receives four-bit encoded bits from the encoding unit 101 and generates two first phase rotation sequences. The phase rotation sequence generation unit 110c connects the two first phase rotation sequences together, thereby providing a signal sequence for eight samples (P×2=8), after which the phase rotation sequence generation unit 110c multiplies the signal sequence for eight samples by the second phase rotation sequence to thereby generate the phase rotation sequence for one system. The phase rotation sequence generation unit 110c outputs the generated phase rotation sequence to the up-sampling unit 111.

The up-sampling unit 111 multiplies the sample rate of the phase rotation sequence by "L" as the coefficient for up-sampling is "L", and replicates the phase rotation sequence "L" times as in the first embodiment. The present embodiment sets L=2. That is, the number of samples of the post-upsampling phase rotation sequence is N=M×L=16 samples.

The transmit signal generation unit 102c generates a transmit signal by performing the subsequent processing from the frequency shift unit 112 to the frame generation unit 115 in a manner similar to that of the first embodiment. The transmit signal generation unit 102c outputs the generated transmit signal to the transmission filter 103. Note that the known-signal generation unit 114 employs not the processing of using the two first phase rotation sequences to generate the phase rotation sequence as described in relation to the phase rotation sequence generation unit 110c, but the method using the first phase rotation sequence and the second phase rotation sequence are the same in the number of samples, as described in relation to the phase rotation sequence generation unit 110 of the first embodiment. The known-signal generation unit 114 uses, for example, k=0 as the parameter for associating the encoded bits with the first phase rotation sequence, and generates the first phase rotation sequence having the length equal to the number of samples, M=8, of the second phase rotation sequence.

Note that although the operation of the transmit signal generation unit 102c of the present embodiment is slightly different in content in step S21 of the flowchart illustrated in FIG. 4 from that of the first embodiment, the flow of the operation is similar to that of the flowchart of the first embodiment illustrated in FIG. 4.

Figure 22:
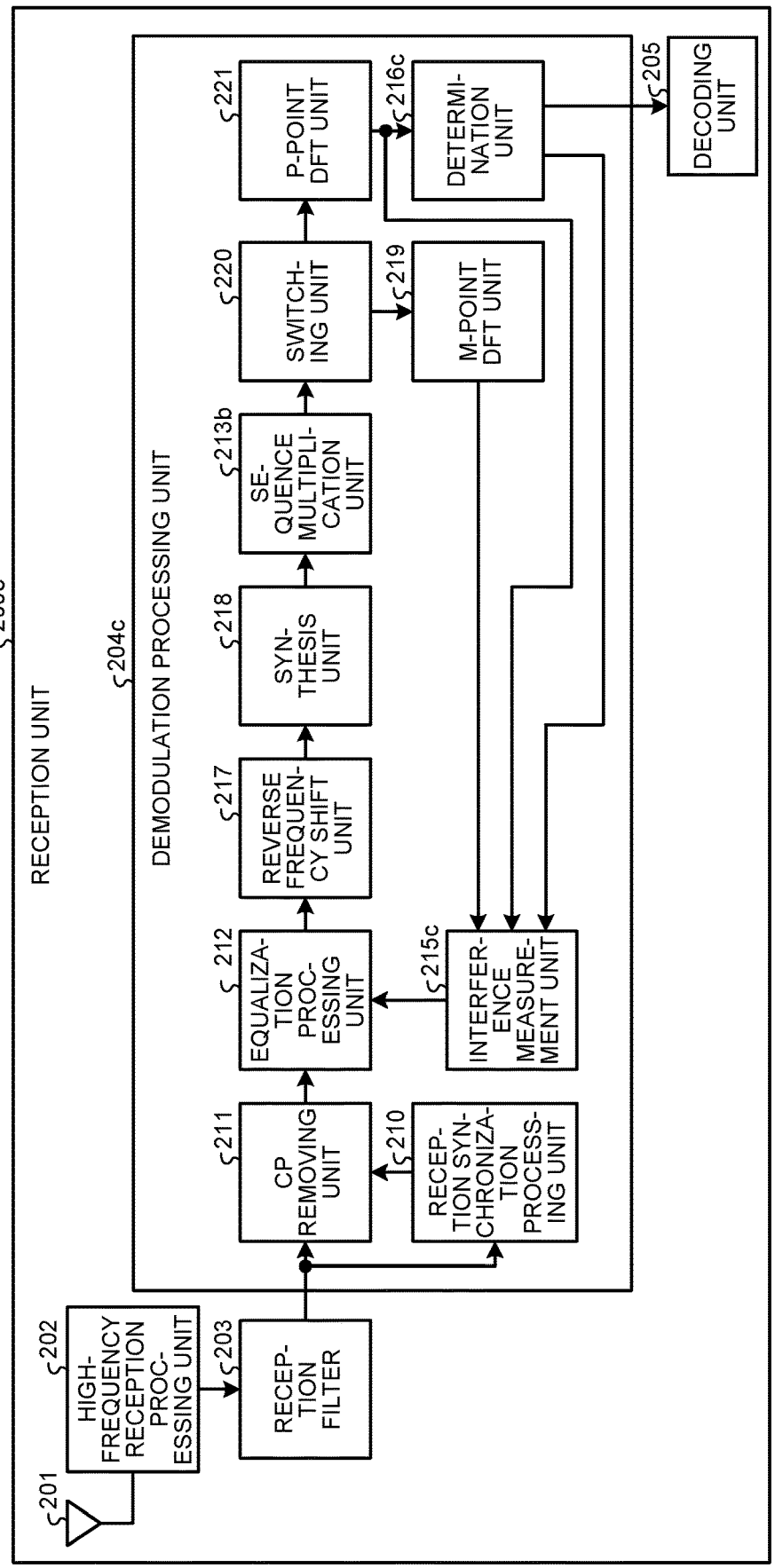
FIG. 22 is a diagram illustrating an example of the configuration of a reception unit of the receiver according to the fourth embodiment.

Next, the configuration and operation of the reception unit of the receiver 20 of the present embodiment will be described. FIG. 22 is a diagram illustrating an example of the configuration of a reception unit 200c of the receiver 20 according to the fourth embodiment. The reception unit 200c differs from the reception unit 200b of the third embodiment illustrated in FIG. 18 in that the demodulation processing unit 204b is replaced with a demodulation processing unit 204c. The demodulation processing unit 204c differs from the demodulation processing unit 204b in that the interference measurement unit 215b and the determination unit 216b are deleted, and an interference measurement unit 215c, a determination unit 216c, a switching unit 220, and a P-point DFT unit 221 are added. The fourth embodiment uses the switching unit 220 to thereby allow the interference measurement unit 215c to calculate a measured interference value on the basis of output of the M-point DFT unit 219 or the P-point DFT unit 221.

In the demodulation processing unit 204c, the processings of the reception synchronization processing unit 210, the CP removing unit 211, the equalization processing unit 212, the reverse frequency shift unit 217, the synthesis unit 218, and the sequence multiplication unit 213b are similar to those of the third embodiment. The sequence multiplication unit 213b outputs the processing result to the switching unit 220.

The switching unit 220 switches signal paths such that the processing result, which is the input signal passed from the sequence multiplication unit 213b, is output to the M-point DFT unit 219 when the processing result is obtained by processing the known signals 400 to 403, or is output to the P-point DFT unit 221 when the processing result is obtained by processing the data signals 404 to 415.

When performing processing on the known signals 400 to 403, the M-point DFT unit 219 performs an M-point discrete Fourier transform on the processing result passed from the switching unit 220. The M-point DFT unit 219 outputs generated frequency domain signals to the interference measurement unit 215c. The interference measurement unit 215c performs the same processing as the interference measurement unit 215b of the third embodiment, and outputs the measured interference value to the equalization processing unit 212.

On the other hand, when performing processing on the data signals 404 to 415, the P-point DFT unit 221, which is a discrete Fourier transform unit, performs a P-point discrete Fourier transform on the signal of "M" samples passed from the switching unit 220. The P-point DFT unit 221 outputs generated frequency domain signals to the interference measurement unit 215c and the determination unit 216c. The number of points "P" of the discrete Fourier transform is a value smaller than the number of samples "M" of the signal passed from the switching unit 220, where M=8 and P=4, which are set in the present embodiment, satisfy a relationship of M=P×2. The P-point DFT unit 221 performs, M/P times, the P-point discrete Fourier transform on the signal passed from the switching unit 220 to generate frequency domain signals for M/P systems. In the present embodiment, the P-point DFT unit 221 performs the discrete Fourier transform on four (P=4) samples in the first half of the signal passed from the switching unit 220, and on the other four (P=4) samples in the second half of that signal. That is, the P-point DFT unit 221 performs the discrete Fourier transform twice (M/P=8/4=2 times) separately, thereby generating frequency domain signals for two systems.

The frequency domain signals for two systems generated by the P-point DFT unit 221 are the frequency domain signals corresponding to the two first phase rotation sequences each of which is "P" in the number of samples that are used by the phase rotation sequence generation unit 110c of FIG. 21 for generating the phase rotation sequence.

The determination unit 216c selects one frequency having the highest signal power for each of the frequency domain signals for two systems, and outputs information on the selected frequencies to the interference measurement unit 215c. The determination unit 216c also outputs, to the decoding unit 205, corresponding encoded bits that are four bits in total. Using the information on the two frequencies passed from the determination unit 216c and the frequency domain signals for two systems passed from the P-point DFT unit 221, the interference measurement unit 215c calculates average signal power for the other frequencies than the frequencies indicated by the information passed from the determination unit 216c. The interference measurement unit 215c outputs, to the equalization processing unit 212, the calculated average signal power that is the measured interference value.

Note that although the operation of the demodulation processing unit 204c of the present embodiment is slightly different in content in step S51 of the flowchart illustrated in FIG. 20 from that of the third embodiment, the flow of the operation is similar to that of the flowchart of the third embodiment illustrated in FIG. 20. Specifically, in step S51, the M-point DFT unit 219 performs the M-point discrete Fourier transform in the third embodiment, whereas the P-point DFT unit 221 performs the P-point discrete Fourier transform in the fourth embodiment.

As described above, according to the present embodiment, the transmit signal generation unit 102c of each of the first transmitter 10 and the second transmitter 11 multiplexes the plurality of first phase rotation sequences. In the receiver 20, the demodulation processing unit 204c includes the discrete Fourier transform unit for the same number of points as the number of samples "P" of the first phase rotation sequence, and performs processing the number of times corresponding to the number of multiplexed first phase rotation sequences. As a result, in addition to the effects of the first to third embodiments, the amount of information that can be transmitted simultaneously from the first transmitter 10 and the second transmitter 11 to the receiver 20 increases so that the communication can be performed at higher speed.

Note that although the present embodiment sets the length of the first phase rotation sequence to half the length of the second phase rotation sequence such that the two first phase rotation sequences are multiplexed together, the number of multiplexing is not limited thereto. Any combination is possible as long as the number of samples of a multiplexed result of the first phase rotation sequences is the same as the number of samples of the second phase rotation sequence.

Moreover, although the present embodiment is based on the assumption that the first phase rotation sequences multiplexed in the phase rotation sequence generation unit 110c are all data signals, the present invention is not limited thereto, for example, some of the signals to be multiplexed together may be known signals, and such some known signals and the data signals may be multiplexed together. In this case, the phase rotation sequence generation unit 110c generates the first phase rotation sequence, using the data signals and the known signals. In this case, among the frequency domain signals for a plurality of systems that is the processing result of the P-point DFT unit 221, those which correspond to parts where the known signals are assigned as the first phase rotation sequence need not be subjected to the determination processing by the receiver 20. Therefore, in calculating the measured interference value, the interference measurement unit 215c does not refer to the information on the frequency passed from the determination unit 216c and can determine, as the measured interference value, a value obtained by averaging the signal power for the frequencies excluding the frequencies used by the transmitter as the known signals. As a result, in the wireless communication system 30, the frequency of insertion of the known signals increases so that a change in the amount of surrounding interference can be grasped more accurately, and good communication quality can be achieved in a stable manner. Moreover, the known signals multiplexed with the data signals may be used by the receiver 20 to perform transmission line estimation and other synchronization processing in combination with a known technique. With such a configuration, communication quality can be stabilized as with interference measurement.

Fifth Embodiment

A fifth embodiment describes a wireless communication system including a repeater that is equipped with the functions of the transmitter and the receiver described in the first to fourth embodiments.

Figure 23:
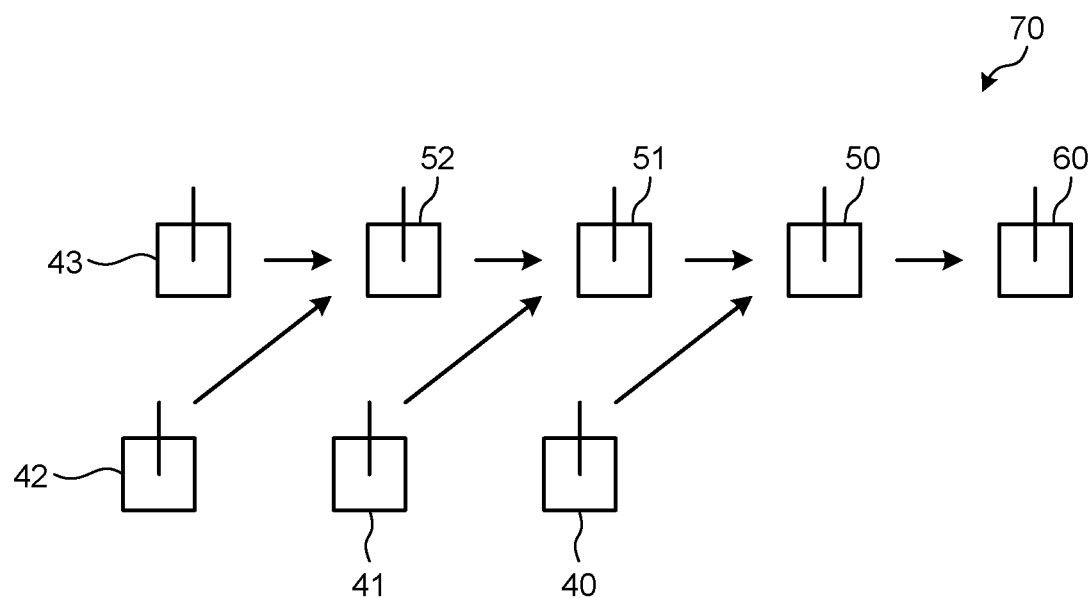
FIG. 23 is a diagram illustrating an example of the configuration of a wireless communication system according to a fifth embodiment.

FIG. 23 is a diagram illustrating an example of the configuration of a wireless communication system 70 according to the fifth embodiment. The wireless communication system 70 includes terminals 40 to 43, repeaters 50 to 52, and an access point 60. In the wireless communication system 70, the terminal and the access point, which cannot transmit/receive signals directly to and from each other, can communicate with each other through the repeater. The present embodiment may use a term device to refer to any of the terminals 40 to 43, the repeaters 50 to 52, and the access point 60.

Figure 24:
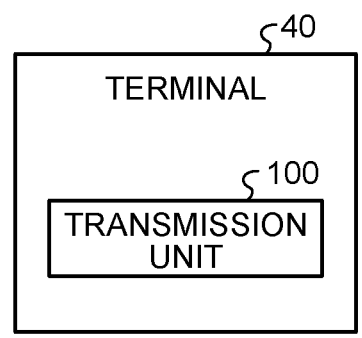
FIG. 24 is a diagram illustrating an example of the configuration of a terminal according to the fifth embodiment.

FIG. 24 is a diagram illustrating an example of the configuration of the terminal 40 according to the fifth embodiment. Since the terminals 40 to 43 have similar configurations, the terminal 40 will be described here as an example. The terminal 40, which is a wireless transmitter, includes the transmission unit 100 illustrated in FIG. 2. The terminal 40 transmits data using the transmission unit 100. Specifically, the terminal 40 transmits data to the repeater 50. Note that the terminal 41 transmits data to the repeater 51. The terminals 42 and 43 transmit data to the repeater 52. The terminal 40 may include the transmission unit 100c instead of the transmission unit 100. The terminal 40 may further include any of the reception units 200, 200a, 200b, and 200c illustrated in FIGS. 8, 16, 18, and 22.

Figure 25:
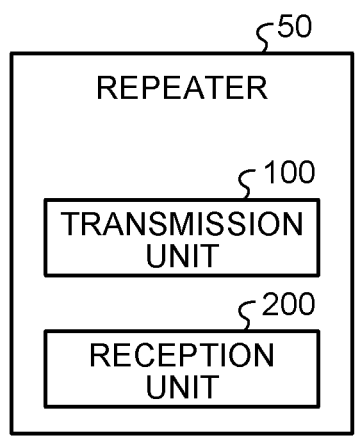
FIG. 25 is a diagram illustrating an example of the configuration of a repeater according to the fifth embodiment.

FIG. 25 is a diagram illustrating an example of the configuration of the repeater 50 according to the fifth embodiment. Since the repeaters 50 to 52 have similar configurations, the repeater 50 will be described here as an example. The repeater 50 includes the transmission unit 100 illustrated in FIG. 2 and the reception unit 200 illustrated in FIG. 8. The repeater 50 receives data from the terminal or another repeater, using the reception unit 200, and transmits or transfers data, using the transmission unit 100. Specifically, the repeater 50 performs relay transmission to the access point 60. Note that the repeater 51 performs relay transmission to the repeater 50. The repeater 52 performs relay transmission to the repeater 51. The repeater 50 may include the transmission unit 100c instead of the transmission unit 100. Also, the repeater 50 may include any of the reception units 200a, 200b, and 200c instead of the reception unit 200.

Figure 26:
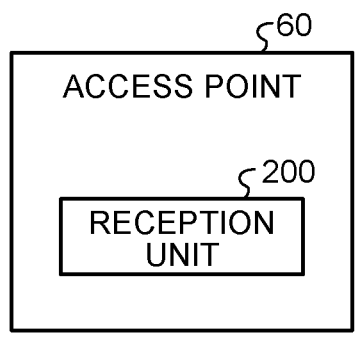
FIG. 26 is a diagram illustrating an example of the configuration of an access point according to the fifth embodiment.

FIG. 26 is a diagram illustrating an example of the configuration of the access point 60 according to the fifth embodiment. The access point 60, which is a wireless receiver, includes the reception unit 200 illustrated in FIG. 8. The access point 60 receives data transmitted from the repeater or the terminal by using the reception unit 200. The access point 60 may include any of the reception units 200a, 200b, and 200c instead of the reception unit 200. The access point 60 may further include any one of the transmission units 100 and 100c illustrated in FIGS. 2 and 22.

Figure 27:
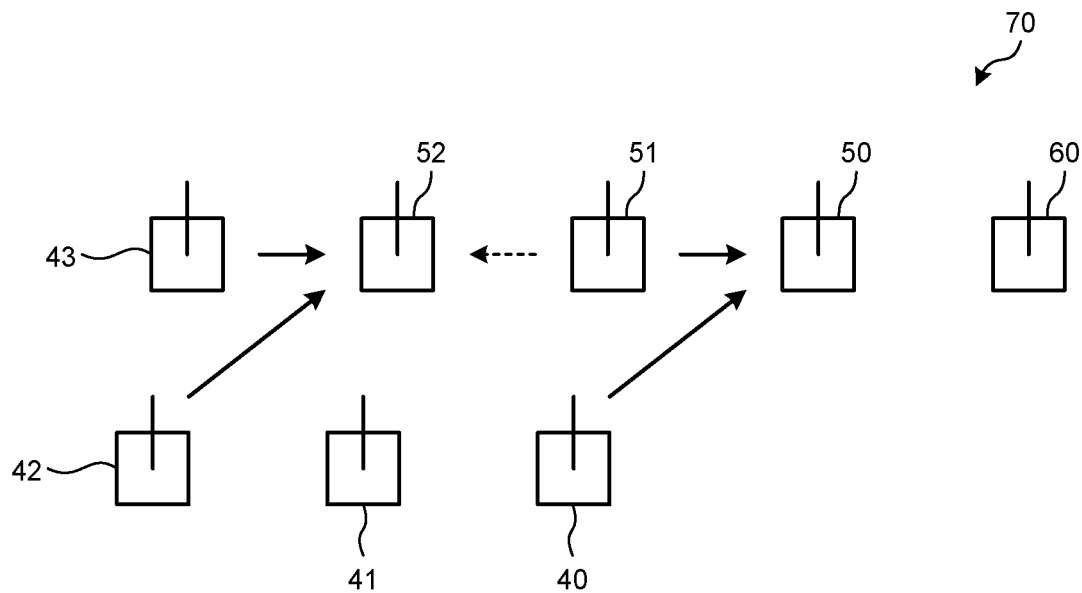
FIG. 27 is a diagram illustrating a flow of data transmitted and received among devices at a certain timing in the wireless communication system according to the fifth embodiment.
Figure 28:
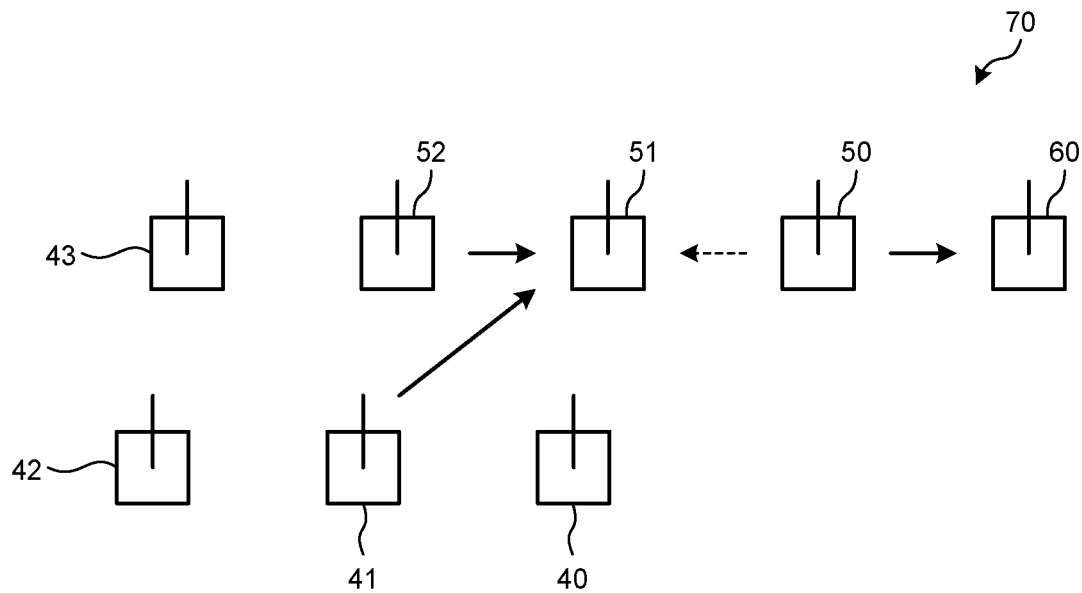
FIG. 28 is a diagram illustrating a flow of data transmitted and received among the devices at a timing different from that of FIG. 27 in the wireless communication system according to the fifth embodiment.

The timing at which each device of the wireless communication system 70 transmits and receives data will be described. The present embodiment uses time division duplex (TDD) in which the transmission timing and the reception timing of each device are temporally divided. FIG. 27 is a diagram illustrating a flow of data transmitted and received among the devices at a certain timing in the wireless communication system 70 according to the fifth embodiment. At the timing illustrated in FIG. 27, the terminal 40 and the repeater 51 are transmitting data, and the repeater 50 is receiving the data. Also, the terminals 42 and 43 are transmitting data, and the repeater 52 is receiving the data. FIG. 28 is a diagram illustrating a flow of data transmitted and received among the devices at a timing different from that of FIG. 27 in the wireless communication system 70 according to the fifth embodiment. At the timing illustrated in FIG. 28, the repeater 50 is transmitting data, and the access point 60 is receiving the data. Also, the terminal 41 and the repeater 52 are transmitting data, and the repeater 51 is receiving the data. In the wireless communication system 70, the data transmission/reception processing illustrated in FIG. 27 and the data transmission/reception processing illustrated in FIG. 28 alternate with time. The present embodiment uses the same frequency channel for wireless transmission between the devices. Moreover, the distance between the repeaters 51 and 52 and between the repeaters 50 and 51 is set such that the wireless communication can be made. In this case, when the repeater 51 is transmitting data in the example of FIG. 27, the data also reaches the repeater 52 as an interference signal as indicated by a dotted arrow. Similarly, when the repeater 50 is transmitting data in the example of FIG. 28, the data also reaches the repeater 51 as an interference signal as indicated by a dotted arrow.

Figure 29:
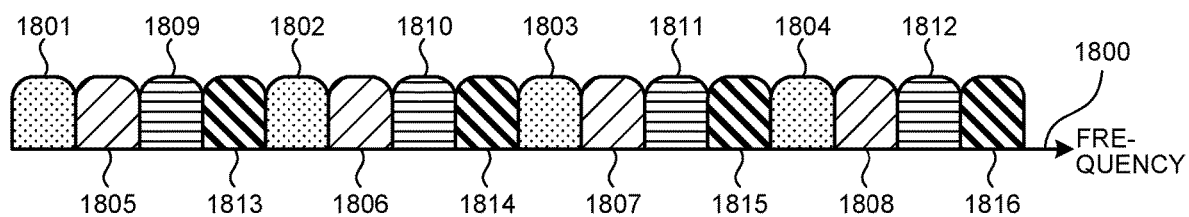
FIG. 29 is a diagram illustrating an example of transmission spectra used by the devices at the data transmission/reception timing illustrated in FIG. 27 in the wireless communication system according to the fifth embodiment.
Figure 30:
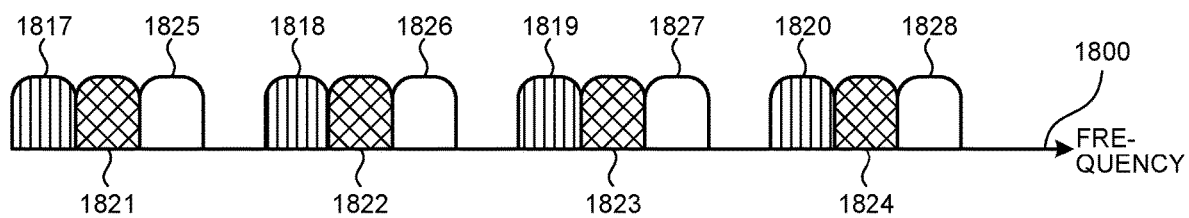
FIG. 30 is a diagram illustrating an example of transmission spectra used by the devices at the data transmission/reception timing illustrated in FIG. 28 in the wireless communication system according to the fifth embodiment.

A method of setting parameters used for the wireless transmission by each terminal and each repeater in the wireless communication system 70 of FIG. 23 will be described. In the present embodiment, the devices performing transmission at the same time set the phase rotation θ of the frequency shift unit of the transmit signal generation unit such that the data, that is, a desired transmit signal, and the above interference signal do not overlap on the frequency axis. FIGS. 29 and 30 illustrate an image of transmission spectra when specific settings are reflected.

FIG. 29 is a diagram illustrating an example of transmission spectra used by the devices at the data transmission/reception timing illustrated in FIG. 27 in the wireless communication system 70 according to the fifth embodiment. FIG. 29 illustrates a case where a total of 16 frequency bands are available, and each device employs a phase rotation sequence with M=4 and up-sampling processing with L=4. In FIG. 29, the devices transmitting signals at the same time are configured such that the transmission spectra do not overlap on the frequency axis. That is, the magnitude of the amount of frequency shift set for a certain device is different from the magnitude of the amount of frequency shift set for another device. Specifically, on a frequency axis 1800, transmission spectra 1801 to 1804 are frequency spectra used for transmission by the terminal 42, transmission spectra 1805 to 1808 are frequency spectra used for transmission by the terminal 43, transmission spectra 1809 to 1812 are frequency spectra used for transmission by the repeater 51, and transmission spectra 1813 to 1816 are frequency spectra used for transmission by the terminal 40.

FIG. 30 is a diagram illustrating an example of transmission spectra used by the devices at the data transmission/reception timing illustrated in FIG. 28 in the wireless communication system 70 according to the fifth embodiment. FIG. 30 illustrates a case where a total of 16 frequency bands are available, and each device employs a phase rotation sequence with M=4 and up-sampling processing with L=4. Note that FIG. 30 illustrates a case where 12 out of the 16 frequency bands are used. In FIG. 30, the devices transmitting signals at the same time are configured such that the transmission spectra do not overlap on the frequency axis. That is, the amount of frequency shift set for a certain device is different in magnitude from the amount of frequency shift set for another device. Specifically, on the frequency axis 1800, transmission spectra 1817 to 1820 are frequency spectra used for transmission by the terminal 41, transmission spectra 1821 to 1824 are frequency spectra used for transmission by the repeater 52, and transmission spectra 1825 to 1828 are frequency spectra used for transmission by the repeater 50.

In consideration of the transmission timing of each terminal and each repeater and conditions under which the devices interfere with each other, the transmission unit 100 and the reception unit 200 of the devices in the wireless communication system 70 are configured such that the transmission spectra of the devices do not overlap on the frequency axis. In the wireless communication system 70, the amount of frequency shift and the type of the phase rotation sequence are set for each device on the basis of the transmission timing and the reception timing of each device. As a result, the wireless communication system 70 performing communication via the repeaters 50 to 52 can achieve good communication quality reducing the influence of interference. The wireless communication system 70 can achieve stable communication avoiding the near-far problem especially under the condition where the distances between the terminals are largely different from one another.

Figure 31:
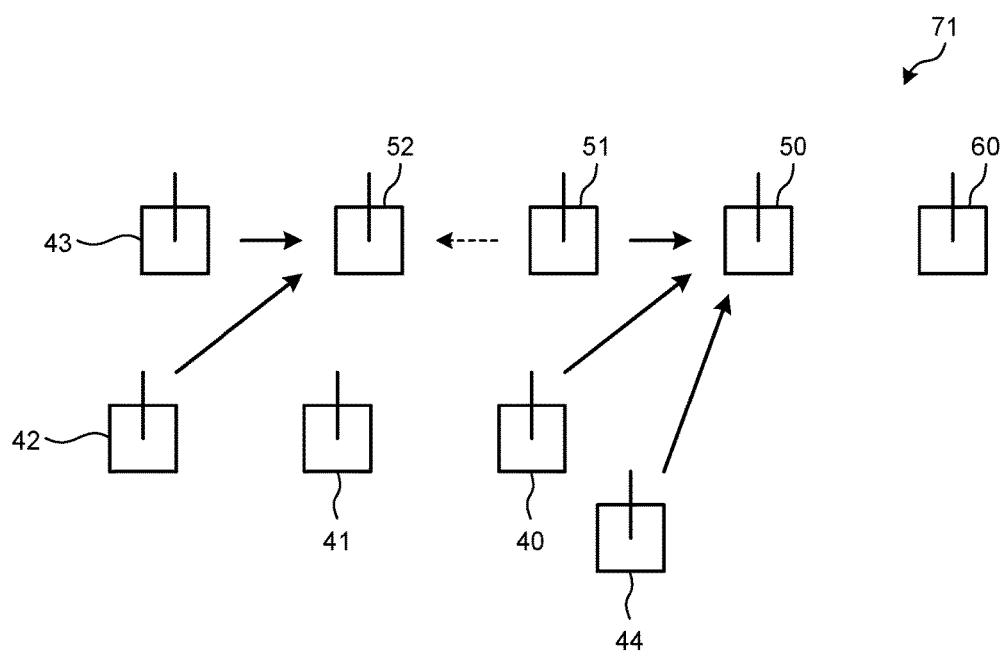
FIG. 31 is a diagram illustrating an example of the configuration of a wireless communication system obtained by adding a terminal to the wireless communication system of FIG. 23 in the fifth embodiment.
Figure 32:
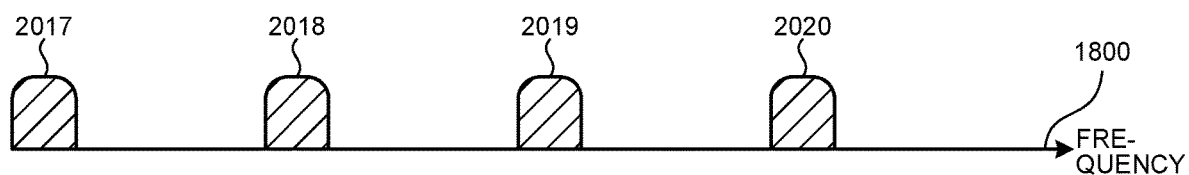
FIG. 32 is a diagram illustrating an example of transmission spectra used by the terminal at a data transmission/reception timing illustrated in FIG. 31 in the wireless communication system according to the fifth embodiment.

Next, another method of setting the parameters in the present embodiment will be described. FIG. 31 is a diagram illustrating an example of the configuration of a wireless communication system 71 obtained by adding a terminal 44 to the wireless communication system 70 of FIG. 23 in the fifth embodiment. The terminal 44 has a configuration similar to that of the terminals 40 to 43, and transmits data to the repeater 50. In the wireless communication system 71, the data transmission/reception timing of the devices except for the terminal 44 is similar to that in the cases of FIGS. 29 and 30. The total number of terminals and repeaters transmitting signals at the same time in the wireless communication system 71 illustrated in FIG. 31 is five. Therefore, the signal transmission method illustrated in FIG. 29 is short of available frequencies. FIG. 32 illustrates an example of parameter setting for the terminal 44 in this case. FIG. 32 is a diagram illustrating an example of transmission spectra used by the terminal 44 at a data transmission/reception timing illustrated in FIG. 31 in the wireless communication system 71 according to the fifth embodiment. Specifically, on the frequency axis 1800, transmission spectra 2017 to 2020 are frequency spectra used for transmission by the terminal 44. Note that when the terminal 44 transmits data at the timing in FIG. 32, the terminals 42 and 43, the repeater 51, and the terminal 40 transmit data at the same time, using the transmission spectra 1801 to 1816 illustrated in FIG. 29. In the wireless communication system 71 illustrated in FIG. 31, the terminal 44 is communicating with the repeater 50, and the amount of interference caused by the terminal 44 with the repeater 52 is smaller in effect than the interference caused by the repeater 51 with the repeater 52. Therefore, in the wireless communication system 71, the transmit signal of the terminal 44 is arranged not to overlap the transmit signals of the repeater 51 and the terminal 40 on the frequency axis, but is allowed to overlap the transmit signals of the terminals 42 and 43. With this configuration, the wireless communication system 71 can reduce the amount of mutual interference of the signals transmitted at the same time from the total of five devices.

Moreover, another method of parameter setting in the present embodiment includes not only arranging the transmit signals so as not to overlap one another on the frequency axis, but also assigning, to the phase rotation sequence generation unit of the transmit signal generation unit of each of the devices, a second phase rotation sequence having low correlation with the other devices. This can be achieved by, for example, preparing in advance a plurality of the parameters "r" indicating the type of the second phase rotation sequence described in the first embodiment, and assigning a combination of those parameters to devices that may cause interference, the assigned combination of the parameters having a lower cross correlation between the devices than a specific threshold. Where this configuration is applied to the wireless communication system 71 using the transmission spectra illustrated in FIGS. 29 and 32, for example, the parameter "r" of the second phase rotation sequence used by the terminal 44 and the parameter "r" used by the terminals 42 and 43 are assigned different values that lowers the cross correlation. As a result, even in a situation where the signal from the terminal 44 reaches the repeater 52, the amount of the interference which the communication of the terminals 42 and 43 experiences can be reduced. Moreover, the devices whose signals are set to not overlap each other on the frequency axis may be assigned different second phase rotation sequences having low cross correlation. This configuration can reduce deterioration of communication quality as the cross correlation between the second phase rotation sequences is low even when the signals interfere with each other due to the influence of a frequency offset between the devices or the like. In the wireless communication system 71, the amount of frequency shift and the type of the phase rotation sequence are set for each device on the basis of the transmission timing of each device and the amount of interference at the repeater.

Furthermore, the devices performing signal transmission at the same time may be assigned different values of the number of samples "M" of the phase rotation sequence and the coefficient "L" of up-sampling. For example, FIGS. 33 and 34 each illustrate another example of parameter setting in the wireless communication system 71 illustrated in FIG. 31.

Figure 33:
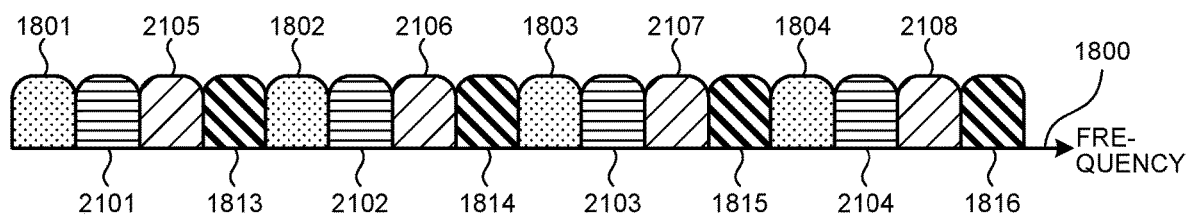
FIG. 33 is a diagram illustrating an example of transmission spectra used by the devices at the data transmission/reception timing illustrated in FIG. 31 in the wireless communication system according to the fifth embodiment.

FIG. 33 is a diagram illustrating an example of transmission spectra used by the devices at the data transmission/reception timing illustrated in FIG. 31 in the wireless communication system 71 according to the fifth embodiment. In FIG. 33, the devices transmitting signals at the same time are configured such that the transmission spectra do not overlap. Specifically, on the frequency axis 1800, the transmission spectra 1801 to 1804 are the frequency spectra used by the terminal 42 for transmission, transmission spectra 2101 to 2104 are frequency spectra used by the repeater 51 for transmission, transmission spectra 2105 to 2108 are frequency spectra used by the terminal 43 for transmission, and the transmission spectra 1813 to 1816 are the frequency spectra used by the terminal 40 for transmission. The transmission spectra of the devices illustrated in FIG. 33 is different from the transmission spectra of the devices illustrated in FIG. 29 in that the arrangement of the transmission spectra used by the repeater 51 and the arrangement of the transmission spectra used by the terminal 43 swap with each other.

Figure 34:
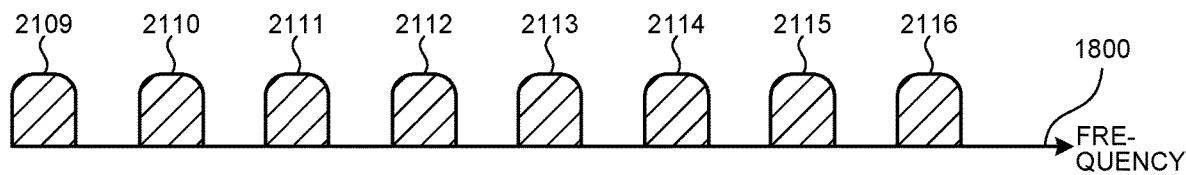
FIG. 34 is a diagram illustrating another example of transmission spectra used by the terminal at the data transmission/reception timing illustrated in FIG. 31 in the wireless communication system according to the fifth embodiment.

FIG. 34 is a diagram illustrating another example of transmission spectra used by the terminal 44 at the data transmission/reception timing illustrated in FIG. 31 in the wireless communication system 71 according to the fifth embodiment. Specifically, on the frequency axis 1800, transmission spectra 2109 to 2116 are frequency spectra used by the terminal 44 for transmission. Note that when the terminal 44 transmits data at the timing in FIG. 34, the terminal 42, the repeater 51, the terminal 43, and the terminal 40 transmit data at the same time using the transmission spectra illustrated in FIG. 33. In the example of FIG. 34, the transmit signal generation unit of the terminal 44 uses M=8 and L=2 as the parameters. Also, the phase rotation θ used in the frequency shift unit is the same as the case of FIG. 32. With this configuration, the transmission spectra of the signal transmitted by the terminal 44 overlap those of the terminals 42 and 43. Moreover, the density of the transmission spectra of the signal transmitted by the terminal 44 is lower than in the case of FIG. 32, whereby the effect of interference received when the repeater 52 receives signals can be further reduced. Furthermore, as another configuration, the number of samples "M" of the phase rotation sequence and the coefficient "L" of up-sampling may be dynamically controllable in accordance with the communication environment. For example, assume that while communication is performed with the frequency band of the transmission spectra assigned to each device as illustrated in FIGS. 33 and 34, the communication of the terminal 42 ends with the result that the frequency band corresponding to the transmission spectra 1801 to 1804 illustrated in FIG. 33 has become unused. In this case, changing the parameters of the terminal 44 to the values similar to those used in FIG. 32 makes it possible to provide all the transmit signals that do not overlap on the frequency axis.

Note that although the present embodiment has specifically described above the method of arranging the frequencies and assigning the parameters of the second phase rotation sequence with respect to the devices, it is desirable to adjust the method of assigning the parameters as appropriate such that the effect of interference can be further reduced on the basis of the installation conditions of the devices, the reception level of wireless signals, and the like. For example, when the devices are unmovably installed, a rough amount of interference can be identified in advance on the basis of the distance between the devices and a propagation state therebetween. On the basis of such information obtained in advance, a combination which would cause the prominent near-far problem may be preferentially assigned the transmission spectra arranged without overlapping on the frequency axis, and if it is impossible to assign such transmission spectra, the combination may be assigned overlapping transmission spectra, but assigned different phase rotation sequences. Moreover, assuming that the devices can move during operation of the wireless communication system, the measured interference values, which the repeaters and the access point measured in receiving signals, can be shared between the devices so that the method of assigning the transmit frequencies and the phase rotation sequence can be changed on the basis of the measured interference values. Note that instead of sharing the measured interference values between the devices, a centralized controller may be prepared separately from the devices, such that the frequencies and parameters related to the phase rotation sequence for all the devices are managed together by the centralized controller.

Figure 35:
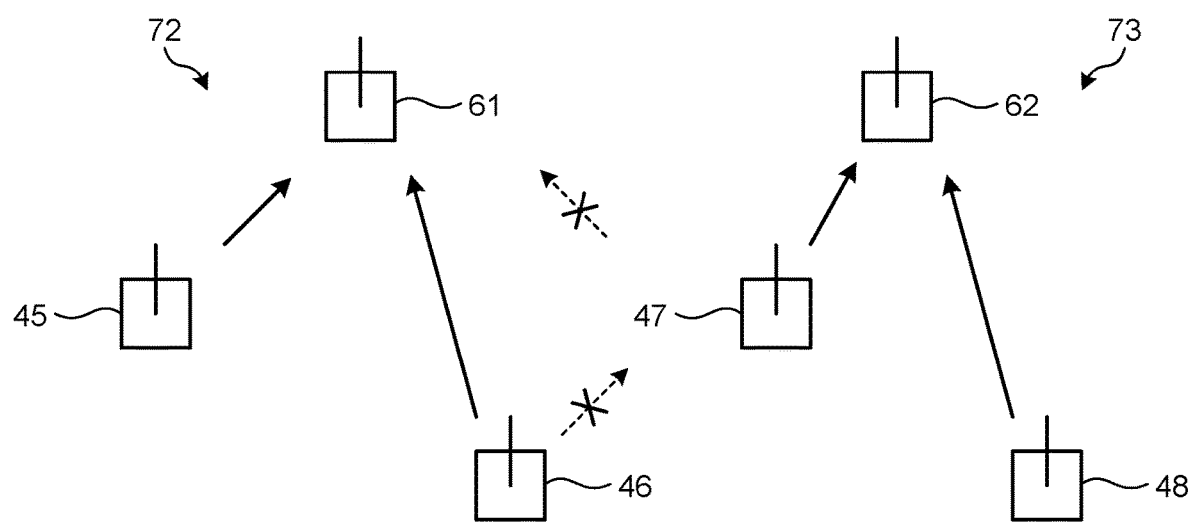
FIG. 35 is a diagram illustrating an example in which wireless communication systems are adjacent to each other in the fifth embodiment.

Moreover, the present embodiment has described the case where the wireless communication system performs relay transmission as an example, but a wireless communication system to which the present invention can be applied is not limited thereto. For example, the transmitter and receiver of the present invention may be applied to different wireless communication systems adjacent to each other as illustrated in FIG. 35, where interference is reduced by changing the positions of the transmission spectra and the type of the second phase rotation sequence. FIG. 35 is a diagram illustrating an example in which wireless communication systems are adjacent to each other in the fifth embodiment. A wireless communication system 72 includes an access point 61 and terminals 45 and 46. In the wireless communication system 72, the terminals 45 and 46 transmit data to the access point 61, and the access point 61 receives the data from the terminals 45 and 46. A wireless communication system 73 includes an access point 62 and terminals 47 and 48. In the wireless communication system 73, the terminals 47 and 48 transmit data to the access point 62, and the access point 62 receives the data from the terminals 47 and 48. For example, assume that the terminals 45 to 48 simultaneously transmit signals, using the same frequency channel, and the access point 61 receives the signals from the terminals 45 and 46 while the access point 62 receives the signals from the terminals 47 and 48. In such a case, the same idea as described in the present embodiment that the transmission spectra of the signals transmitted by the terminals are assigned so as not to overlap on the frequency axis can achieve good communication that can reduce interference. Moreover, even when the interference cannot be reduced only by the manner of assigning the spectra on the frequency axis, the interference can be decreased by assigning different second phase rotation sequences that have low cross correlation with each other.

The configuration illustrated in the aforementioned embodiment merely illustrates an example of the content of the present invention, and can thus be combined with another known technique or partially omitted and/or modified without departing from the scope of the present invention.

REFERENCE SIGNS LIST

10 first transmitter; 11 second transmitter; 20 receiver; 30, 70 to 73 wireless communication system; 40 to 48 terminal; 50 to 52 repeater; 60 to 62 access point; 100, 100*c* transmission unit; 101 encoding unit; 102, 102*c* transmit signal generation unit; 103 transmission filter; 104 high-frequency transmission processing unit; 105 transmitting antenna; 110, 110*c* phase rotation sequence generation unit; 111 up-sampling unit; 112 frequency shift unit; 113 CP adding unit; 114 known-signal generation unit; 115 frame generation unit; 200, 200*a*, 200*b*, 200*c* reception unit; 201 receiving antenna; 202 high-frequency reception processing unit; 203 reception filter; 204, 204*a*, 204*b*, 204*c* demodulation processing unit; 205 decoding unit; 210 reception synchronization processing unit; 211 CP removing unit; 212 equalization processing unit; 213, 213*b* sequence multiplication unit; 214 N-point DFT unit; 215, 215*a*, 215*b*, 215*c* interference measurement unit; 216, 216*a*, 216*b*, 216*c* determination unit; 217 reverse frequency shift unit; 218 synthesis unit; 219 M-point DFT unit; 220 switching unit; 221 P-point DFT unit; 250 distribution unit; 251 transmission line estimation unit; 252 equalization coefficient calculation unit; 253 distortion correction unit.

The invention claimed is:
1. A wireless transmitter comprising:
   phase rotation sequence generation circuitry to generate, on a basis of input transmit bits, a phase rotation sequence in which a frequency response has a bandwidth;

up-sampling circuitry to change a sample rate of the phase rotation sequence and further replicate the phase rotation sequence; and frequency shift circuitry to shift, by a specified amount of shift on a frequency axis, a frequency component of the phase rotation sequence acquired from the up-sampling circuitry, wherein when the phase rotation sequence generation circuitry generates the phase rotation sequence, using a first phase rotation sequence and a second phase rotation sequence whose frequency component changes with time, the first phase rotation sequence being a frequency modulated signal whose frequency is selected as one frequency from a plurality of frequencies and on the basis of the transmit bits, the phase rotation sequence generation circuitry generates the phase rotation sequence, using a plurality of the first phase rotation sequences that has a sequence length shorter than a sequence length of the second phase rotation sequence.

2. The wireless transmitter according to claim 1, wherein the phase rotation sequence generation circuitry generates the first phase rotation sequence, using a data signal and a known signal.

3. The wireless transmitter according to claim 1, wherein the magnitude of the specified amount of shift is different from the magnitude of an amount of shift set in another wireless transmitter, and the frequency shift circuitry shifts the frequency component of the phase rotation sequence on the frequency axis on the basis of the specified amount of shift, to thereby allow the wireless transmitter to transmit a signal such that the transmitted signal does not overlap a signal transmitted from the other wireless transmitter on the frequency axis.

4. The wireless transmitter according to claim 1, wherein the phase rotation sequence generation circuitry generates the phase rotation sequence, using the second phase rotation sequence having cross correlation with another wireless transmitter, the cross correlation being lower than a specified threshold.

5. A wireless receiver that receives a signal transmitted from the wireless transmitter according to claim 1, the wireless receiver comprising:

equalization processing circuitry to correct distortion received on a wireless transmission path;

sequence multiplication circuitry to multiply a signal corrected by the equalization processing circuitry, by a complex conjugate of a second phase rotation sequence that is used when the wireless transmitter generates a phase rotation sequence;

discrete Fourier transform circuitry to perform a discrete Fourier transform on a result of processing by the sequence multiplication circuitry and obtain a frequency domain signal;

determination circuitry to perform signal determination on the basis of the frequency domain signal; and interference measurement circuitry to calculate a measured interference value with respect to the frequency domain signal on the basis of a signal of a frequency other than a frequency including a transmit signal component.

6. The wireless receiver according to claim 5, wherein the interference measurement circuitry calculates the measured interference value when the transmit signal component is a known signal or a data signal.

7. The wireless receiver according to claim 5, further comprising:

reverse frequency shift circuitry to remove, from the signal received from the wireless transmitter, an amount of shift of a frequency component shifted by the wireless transmitter; and synthesis circuitry to synthesize the phase rotation sequence replicated by the wireless transmitter, wherein the sequence multiplication circuitry multiplies the synthesized signal by the complex conjugate.

8. A wireless communication system comprising:

a wireless transmitter comprising:

phase rotation sequence generation circuitry to generate, on a basis of input transmit bits, a phase rotation sequence in which a frequency response has a bandwidth;

up-sampling circuitry to change a sample rate of the phase rotation sequence and further replicate the phase rotation sequence; and frequency shift circuitry to shift, by a specified amount of shift on a frequency axis, a frequency component of the phase rotation sequence acquired from the up-sampling circuitry, wherein when the phase rotation sequence generation circuitry generates the phase rotation sequence, using a first phase rotation sequence and a second phase rotation sequence whose frequency component changes with time, the first phase rotation sequence being a frequency modulated signal whose frequency is selected on the basis of the transmit bits, the phase rotation sequence generation circuitry generates the phase rotation sequence, using a plurality of the first phase rotation sequences that has a sequence length shorter than a sequence length of the second phase rotation sequence; and the wireless receiver according to claim 5, wherein the wireless transmitter and the wireless receiver each set an amount of frequency shift and a type of a phase rotation sequence on the basis of a transmission timing of the wireless transmitter and an amount of interference in the wireless receiver.

9. The wireless communication system according to claim 8, further comprising a repeater including the wireless transmitter and the wireless receiver, wherein the repeater relays a signal received from another wireless transmitter to another wireless receiver, such that the wireless transmitter and the wireless receiver that are not capable of transmitting and receiving a signal directly to and from each other establish communication therebetween via relaying by the repeater.

10. The wireless communication system according to claim 9, wherein a transmission timing of the wireless transmitter and the repeater and a reception timing of the wireless receiver and the repeater are controlled by time division duplex, and the amount of frequency shift and the type of the phase rotation sequence of the wireless transmitter, the wireless receiver, and the repeater are set on the basis of the transmission timing and the reception timing controlled by the time division duplex.

11. A control circuit for controlling a wireless receiver that receives a signal transmitted from the wireless transmitter according to claim 1, the control circuit causing the wireless receiver to:

correct distortion received on a wireless transmission path;

multiply a corrected signal by a complex conjugate of a second phase rotation sequence that is used when the wireless transmitter generates a phase rotation sequence;

perform a discrete Fourier transform on a result of processing having the corrected signal multiplied by the complex conjugate of a second phase rotation sequence, and obtain a frequency domain signal;

perform signal determination on the basis of the frequency domain signal; and calculate a measured interference value with respect to the frequency domain signal on the basis of a signal of a frequency other than a frequency including a transmit signal component.

12. A non-transitory computer readable storage medium storing a program for controlling a wireless receiver that receives a signal transmitted from the wireless transmitter according to claim 1, the program causing the wireless receiver to:

correct distortion received on a wireless transmission path;

multiply a corrected signal by a complex conjugate of a second phase rotation sequence that is used when the wireless transmitter generates a phase rotation sequence;

perform a discrete Fourier transform on a result of processing having the corrected signal multiplied by the complex conjugate of a second phase rotation sequence, and obtain a frequency domain signal;

perform signal determination on the basis of the frequency domain signal; and calculate a measured interference value with respect to the frequency domain signal on the basis of a signal of a frequency other than a frequency including a transmit signal component.

13. A control circuit for controlling a wireless transmitter, the control circuit causing the wireless transmitter to:

generate, on a basis of input transmit bits, a phase rotation sequence in which a frequency response has a bandwidth;

change a sample rate of the phase rotation sequence and further replicate the phase rotation sequence; and shift, by a specified amount of shift on a frequency axis, a frequency component of the phase rotation sequence, wherein in generating the phase rotation sequence, using a first phase rotation sequence and a second phase rotation sequence whose frequency component changes with time, the first phase rotation sequence being a frequency modulated signal whose frequency is selected as one frequency from a plurality of frequencies and on the basis of the transmit bits, the control circuit causes the wireless transmitter to generate the phase rotation sequence, using a plurality of the first phase rotation sequences that has a sequence length shorter than a sequence length of the second phase rotation sequence.

14. A non-transitory computer readable storage medium storing a program for controlling a wireless transmitter, the program causing the wireless transmitter to:

generate, on a basis of input transmit bits, a phase rotation sequence in which a frequency response has a bandwidth;

change a sample rate of the phase rotation sequence and further replicate the phase rotation sequence; and shift, by a specified amount of shift on a frequency axis, a frequency component of the phase rotation sequence, wherein in generating the phase rotation sequence, using a first phase rotation sequence and a second phase rotation sequence whose frequency component changes with time, the first phase rotation sequence being a frequency modulated signal whose frequency is selected as one frequency from a plurality of frequencies and on the basis of the transmit bits, the control circuit causes the wireless transmitter to generate the phase rotation sequence, using a plurality of the first phase rotation sequences that has a sequence length shorter than a sequence length of the second phase rotation sequence.

* * * * *